(12) United States Patent
Kirsch et al.

(10) Patent No.: US 11,478,823 B2
(45) Date of Patent: Oct. 25, 2022

(54) ECCENTRIC VIBRATOR SYSTEMS AND METHODS

(71) Applicant: DERRICK CORPORATION, Buffalo, NY (US)

(72) Inventors: Raymond M. Kirsch, Strykersville, NY (US); Joseph Hozdic, Clarence, NY (US)

(73) Assignee: DERRICK CORPORATION, Buffalo, NY (US)

( * ) Notice: Subject to any disclaimer, the term of this patent is extended or adjusted under 35 U.S.C. 154(b) by 22 days.

(21) Appl. No.: 17/338,009

(22) Filed: Jun. 3, 2021

(65) Prior Publication Data

US 2021/0283659 A1 Sep. 16, 2021

Related U.S. Application Data

(63) Continuation of application No. 16/279,838, filed on Feb. 19, 2019, now Pat. No. 11,052,426.
(Continued)

(51) Int. Cl.
*B07B 1/42* (2006.01)
*B07B 1/28* (2006.01)
(Continued)

(52) U.S. Cl.
CPC .............. *B07B 1/42* (2013.01); *B06B 1/161* (2013.01); *B07B 1/284* (2013.01); *G05B 15/02* (2013.01)

(58) Field of Classification Search
CPC ........... B07B 1/42; B06B 1/161; B28D 1/143; G05B 15/02; G01V 1/153; H02P 1/00; H02K 7/06; F16F 7/00
See application file for complete search history.

(56) References Cited

U.S. PATENT DOCUMENTS 3,625,074 A 12/1971 Waschulewski
6,513,664 B1* 2/2003 Logan ................. B07B 1/42
209/366
(Continued)

FOREIGN PATENT DOCUMENTS

CL 2013001014 A1 9/2013
CN 206298803 U 7/2017
(Continued)

*Primary Examiner* — Said Bouziane
(74) *Attorney, Agent, or Firm* — FisherBroyles, LLP; Jason P. Mueller

(57) ABSTRACT

An apparatus that generates vibrational motion is disclosed. The apparatus includes a first mass, a second mass, a drive system, and a control system. The first mass is eccentrically mounted on, and configured to rotate about, a first shaft. The second mass is eccentrically mounted on, and configured to rotate about, a second shaft, with first and second shafts sharing a common axis. The drive system imparts rotational motion to first and second shafts, and the control system controls rotational frequencies, directions, and initial angles of the first and second masses. Linear, elliptical, or circular vibratory motion of the apparatus may be induced by controlling such rotational properties of the first and second masses. The apparatus may include a measurement device that measures angular position and/or velocity of the first and second masses. The control system may control the vibrational motion based on measurements taken by the measurement device.

30 Claims, 17 Drawing Sheets

Related U.S. Application Data

(60) Provisional application No. 62/632,348, filed on Feb. 19, 2018.

(51) Int. Cl.
*G05B 15/02* (2006.01)
*B06B 1/16* (2006.01)

(56) References Cited

U.S. PATENT DOCUMENTS

| | | | |
|---|---|---|---|
| 7,182,691 B1 * | 2/2007 | Schena | A63F 13/24 |
| | | | 345/161 |
| 2015/0340981 A1 * | 11/2015 | Jolly | H02P 25/032 |
| | | | 318/114 |

FOREIGN PATENT DOCUMENTS

| | | |
|---|---|---|
| CN | 104941895 B | 10/2017 |
| CN | 107891506 A | 4/2018 |
| EA | 200200977 A1 | 4/2003 |
| EP | 2881516 A1 | 6/2015 |
| EP | 3033638 A1 | 6/2016 |
| RU | 2383396 C1 | 3/2010 |
| TW | 318885 | 11/1997 |
| TW | I535156 | 5/2016 |
| TW | 201730458 | 9/2017 |

\* cited by examiner

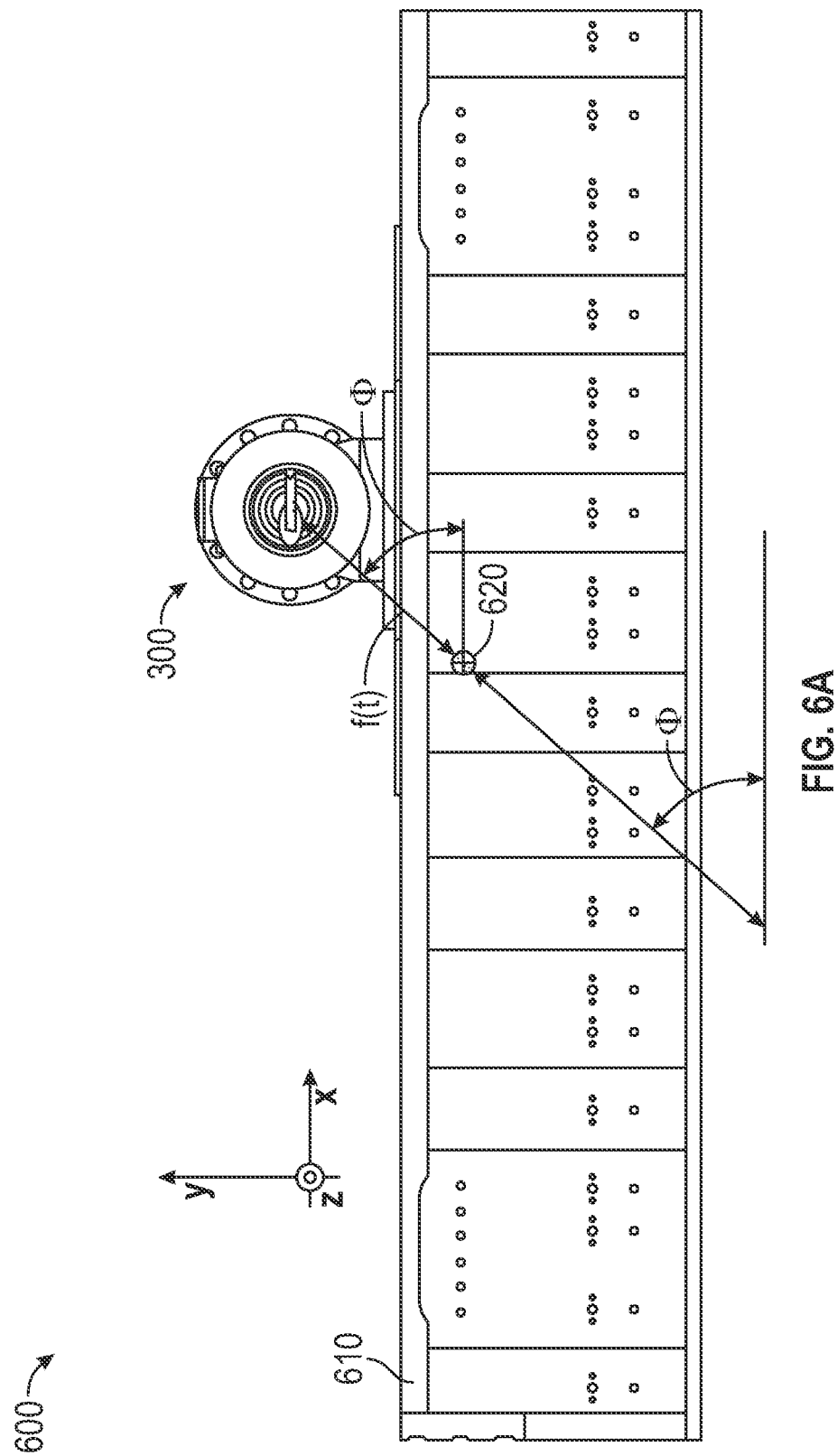

ECCENTRIC VIBRATOR SYSTEMS AND METHODS

CROSS-REFERENCE TO RELATED APPLICATIONS

This application is a continuation of currently pending U.S. patent application Ser. No. 16/279,838, filed Feb. 19, 2019, which claims the benefit of U.S. Provisional Patent Application No. 62/632,348, filed Feb. 19, 2018, the entire contents of which are incorporated herein by reference in its entirety.

BRIEF DESCRIPTION OF THE DRAWINGS

The accompanying drawings are an integral part of the disclosure and are incorporated into the present specification. The drawings illustrate example embodiments of the disclosure and, in conjunction with the description and claims, serve to explain, at least in part, various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

FIG. 6A is a side view of a vibratory system, in accordance with one or more embodiments of the disclosure.

DETAILED DESCRIPTION

Figure 1:
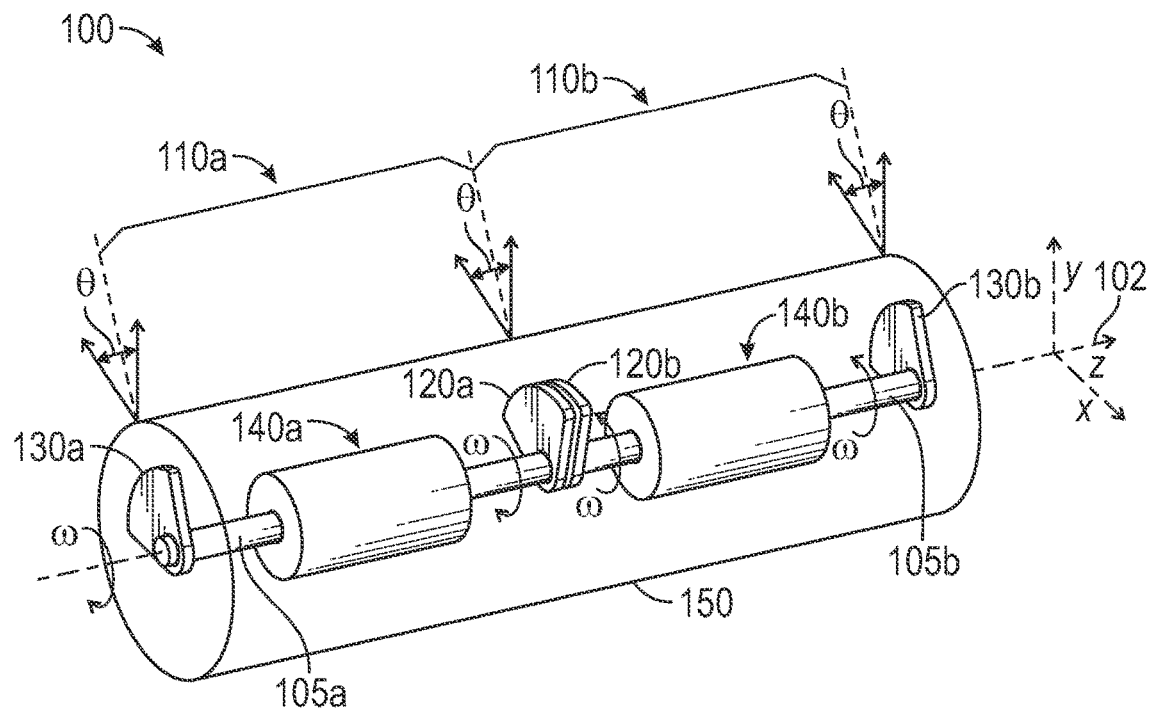
FIG. 1 is a transparent perspective view of an eccentric vibrator apparatus, in accordance with one or more embodiments of the disclosure.

The present disclosure provides systems and methods of generating vibratory forces to drive movement of vibratory industrial equipment or other types of equipment, including user equipment and consumer electronics.

Disclosed embodiments include eccentric vibrator systems that may produce substantially linear, elliptical, and/or circular vibrations. Disclosed embodiments include vibratory systems that may utilize such systems. Disclosed systems may generate respective substantially linear sinusoidal forces that cause substantially linear vibrations. In some embodiments, a vibratory system may be mounted on equipment and may exert a substantially linear sinusoidal force to thereby vibrate the equipment.

A disclosed control system may change an angle of motion and an acceleration of a screening machine. In one example, a slurry (e.g., a semi-liquid mixture) may be dewatered, and conveyed along a vibrating screen of the screening machine under the influence of vibratory motion. The slurry may be transformed from a liquid-solid mixture to a dewatered solid. To increase dryness of the material, disclosed embodiments allow a conveyance angle of the system to be adjusted, which increases liquid removal from the mixture. For example, the conveyance angle may be increased from 45° to 60°. An increased angle may reduce a flow rate of material moving upward on a screening surface, thereby allowing more time for liquid to be driven from the mixture. Similarly, vibrational acceleration of the system may be increased to increase removal of the liquid. Alternatively, vibrational acceleration may be decreased, causing less liquid to be removed, if a wetter discharge is desired. In dry screening applications, vibration of the material may also be increased to reduce an occurrence of stuck particles in the vibrating surface (i.e., to reduce screen blinding).

In one embodiment, an apparatus may include a first motor assembly and a second motor assembly, both disposed within a housing assembly. The first motor assembly may include a first shaft, and the second motor assembly may include a second shaft substantially collinear with the first shaft. The first shaft and the second shaft may be separate elements. The first motor assembly may also include a first plurality of masses attached in a location that is proximate to a first end of the first shaft, and a second, counterbalancing plurality of masses attached proximate to a second end of the first shaft, where the second end of the first shaft is opposite the first end of the first shaft. The second motor assembly may include a third plurality of masses. This third plurality of masses may be attached proximate to a first end of the second shaft, adjacent to the first plurality of masses of the first motor. The second motor assembly may further include a fourth plurality of masses serving as a counter-balancing plurality of masses for the second motor assembly, and being attached proximate to a second end of the second shaft, opposite the first end of the second shaft.

The first shaft and the second shaft may rotate at a defined frequency and in opposite directions, causing the masses included in the apparatus to generate an essentially linear sinusoidal force. Alternatively, the first and second shafts may rotate in the same direction to generate elliptical or circular motion. In some embodiments, a control system may be functionally coupled to the apparatus. The control system may control rotation of first and second shafts, velocity, and/or position of mass members to generate forces having predetermined amplitudes and directions.

While some embodiments of the disclosure are illustrated in connection with industrial equipment, the disclosure is not so limited. Eccentric vibrator systems in accordance with this disclosure may also be used in any other device where vibrations are to be produced, for example, user equipment, consumer electronics, and other types of electronic devices.

FIG. 1 is a transparent perspective view of an eccentric vibrator apparatus 100, in accordance with one or more embodiments of the disclosure. Eccentric vibrator apparatus 100 includes a housing assembly 150 that may have an elongated shape defining an axis 102 (e.g., labeled with a "z" in FIG. 1). Eccentric vibrator apparatus 100 may also include a first motor assembly 110a and a second motor assembly 110b, each disposed within housing assembly 150. In some embodiments, first motor assembly 110a may include a first shaft 105a oriented substantially along axis 102, a first mass member 120a mounted eccentrically on first shaft 105a, and a first counterbalance mass member 130a mounted eccentrically on first shaft 105a.

Figure 2:
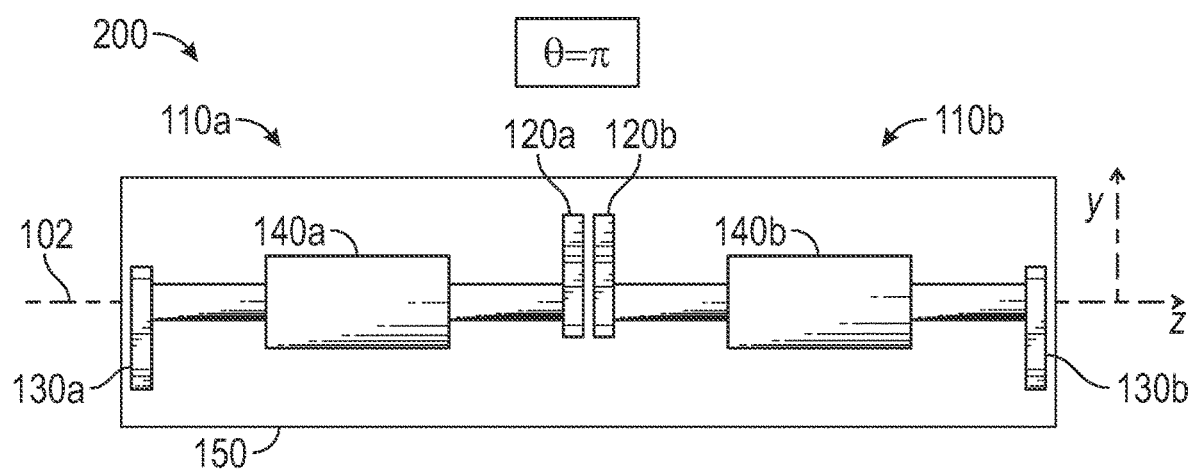
FIG. 2 is a transparent side view of an eccentric vibrator apparatus, in accordance with one or more embodiments of the disclosure.

As shown in FIG. 1, first mass member 120a may be attached proximate to a first end of the first shaft 105a. First counterbalance mass member 130a may be attached proximate to a second end of first shaft 105a. The first mass member 120a and the first counterbalance mass member 130a may each include a plurality of members. In an embodiment, a first member of the first mass member 120a and a first member of the first counterbalance mass member 130a may be configured to be substantially in parallel and may be assembled at a defined angle around a circumference of the first shaft 105a relative to one another. In one example, the defined angle may be approximately 180 degrees (e.g., as shown in FIG. 2 and described in greater detail below).

Second motor assembly 110b may include a corresponding second shaft 105b oriented substantially along axis 102, a second mass member 120b mounted eccentrically on second shaft 105b, and a second counterbalance mass member 130b mounted eccentrically on second shaft 105b. Second mass member 120b may be attached proximate to a first end of second shaft 105b, where the first end of the second shaft 105b is adjacent to the first end of first shaft 105a. Second counterbalance mass member 130b may be attached proximate to a second end of the second shaft 105b, opposite the first end of second shaft 105b. The second mass member 120b and the second counterbalance mass member 130b may each include a plurality of members. A first member of the second mass member 120b and a first member of the second counterbalance mass member 130b may be configured to be substantially in parallel and may be assembled at a defined angle around a circumference of the second shaft 105b relative to one another. In an example, the defined angle may be approximately 180 degrees (e.g., as shown in FIG. 2 and described in greater detail below).

The first mass member 120a and the second mass member 120b may each have a first net mass. Likewise, the first counterbalance mass member 130a and the second counterbalance mass member 130b may each have a second net mass. Various combinations of the first net mass and the second net mass may be chosen, with the magnitude of the second net mass depending on the magnitude of the first net mass, as explained in more detail below. For example, the first net mass may be about 24.0 kg, while the second net mass may be about 3.0 kg. In some embodiments, each member of the first mass member 120a may have a substantially circular sector shape having a radius of about 14.0 cm. Similarly, each member of the second mass member 120b may have a substantially circular sector shape having a radius of about 14.0 cm. Further, each member of the first counterbalance mass member 130a may have a substantially circular sector shape having a radius of about 9.4 cm. Similarly, each member of the second counterbalance mass member 130b may also have a substantially circular sector shape having a radius of about 9.4 cm. Other embodiments may include mass members having other shapes, dimensions, and masses.

Eccentric vibrator apparatus 100 may generate a substantially sinusoidal force with an adjustable magnitude and orientation along a direction substantially perpendicular to axis 102 (e.g., in the x-y plane). In this regard, first shaft 105a is configured to rotate about axis 102 in a first direction at an angular frequency ω (a real number in units of rad/s), and second shaft 105b is configured to rotate about axis 102 at the angular frequency ω, in a second direction. In certain embodiments the second direction may be opposite the first direction, while in other embodiments, the first and second directions may be the same. The angular frequency ω may have a magnitude of up to about 377 rad/s. Rotation in the first direction causes first mass member 120a to produce a first radial force $F_a$ that is substantially perpendicular to a trajectory of circular motion (i.e., perpendicular to the velocity) of first mass member 120a (as described in greater detail below with reference to FIGS. 11 to 14). Similarly, rotation in the second direction causes second mass member 120b to produce a second radial force $F_b$ that is substantially perpendicular to a trajectory (i.e., perpendicular to the velocity) of circular motion of second mass member 120b. Rotation of first shaft 105a and second shaft 105b about axis 102 may yield a resultant force that is substantially contained within a plane perpendicular to the axis 102 (e.g., in the x-y plane). A linearly oscillating force may be generated when first 105a and second 105b shafts are counter-rotating. Alternatively, a force corresponding to circular or elliptical motion may be generated when first 105a and second 105b shafts are co-rotating, as described in greater detail below.

A magnitude of the first force $F_a$ may be determined, in part, by the angular frequency w and the moment of inertia of first mass member 120a. Further, the magnitude of the second force $F_b$ may be determined, in part, by the angular frequency w and the moment of inertia of second mass member 120b. Each member of the first mass member 120a may have a different mass or may share a common first mass, and each member of the second mass member 120b may have a different mass or may share a common second mass. In an embodiment, the first and second masses may be approximately equal. In this case, force $F_a$ would have a similar magnitude to force $F_b$, irrespective of respective angular positions of first and second mass members. Counter rotation of the first shaft 105a and second shaft 105b at angular frequency w may yield a resultant force $F=F_a+F_b$ that is maximal at an angular position in which a tangential velocity of first mass member 120a and a tangential velocity of second mass member 120b are substantially collinear and oriented in the same direction. Further, the resultant force F may vanish at an angular position in which the tangential velocity of first mass member 120a and the tangential velocity of second mass member 120b are substantially collinear and oriented in substantially opposite directions. In an embodiment, the amplitude of the time-dependent resultant force F may have a value of about 89000 N for an angular frequency ω of about 183 rad/s.

In some embodiments, mass members in first mass member 120a may be embodied as respective first slabs disposed substantially perpendicularly to axis 102. Each of these first slabs may be elongated and assembled to be substantially parallel to one another. Further, each of these first slabs may be mounted eccentrically on the first shaft 105a. Similarly, mass members in second mass member 120b may also be embodied as respective second slabs, also disposed substantially perpendicularly to axis 102. Each of the second slabs may also be elongated and assembled to be substantially parallel to one another. In addition, the second slabs may be mounted eccentrically on second shaft 105b.

The first slabs may each have a defined first mass and a defined first size, and the second slabs may also collectively share the defined first mass and the defined first size. Accordingly, the magnitude of the force $F_a$ and the magnitude of the force $F_b$ may be essentially equal irrespective of the respective angular positions of the first slabs and the second slabs. As mentioned, the counter rotation of first shaft 105a and second shaft 105b at angular frequency ω may yield a resultant force $F=F_a+F_b$ that is maximal at an angular position in which the tangential velocity of the first slabs and the tangential velocity of the second slabs are substantially collinear and oriented in the same directions. Likewise, the resultant force F may be substantially zero (or otherwise negligible) at an angular position in which the tangential velocity of the first slabs and the tangential velocity of the second slabs are substantially collinear and oriented in substantially opposite directions.

In some embodiments, as shown in FIG. 1, first mass member 120a is assembled in proximity to and spatially separated along axis 102 from second mass member 120b. At an angular position in which the tangential velocity of first mass member 120a and the tangential velocity of second mass member 120b are substantially collinear and oriented in substantially opposite directions, forces $F_a$ and $F_b$ described herein may not cancel one another completely due to imperfect alignment between first mass member 120a and second mass member 120b, as described in more detail below.

Incomplete cancellation of the forces may result in residual net forces that are oriented along a direction that is transverse to the longitudinal axis 102. For example, the residual net forces may be oriented along the x direction of the Cartesian coordinate system shown in FIG. 1. The spatial offset between mass members 120a and 120b and the residual net forces form a couple, which may distort the linear vibration generated by the eccentric vibrator apparatus 100. In order to remove or reduce such a couple, first counterbalance mass member 130a and second counterbalance mass member 130b are added to eccentric vibrator apparatus 100, as described above. As is illustrated in FIGS. 1 and 2, for example, first counterbalance mass member 130a and second counterbalance mass member 130b also are offset relative to one another, along the longitudinal axis 102. Therefore, due to this spatial offset, counterbalance mass members 130a and 130b also generate an additional couple as a result of incomplete cancellation of forces generated by these mass members. By aligning counterbalance mass members 130a and 130b in a transverse direction opposite the transverse direction along which mass members 120a and 120b are oriented, as shown in FIG. 2, for example, the couple resulting from the counter rotation of the counterbalance mass members 130a and 130b may cancel the couple generated by the mass members 120a and 120b.

In some embodiments, mass members in first counterbalance mass member 130a may share a common first mass, and mass members in second counterbalance mass member 130b may share a common second mass. A magnitude of masses 130a and 130b may therefore be essentially equal. The magnitude of the first and second masses of counterbalancing mass members 130a and 130b may be configured to be less than the net mass of mass members 120a and 120b, due to differences in spatial offsets, as needed to cancel unwanted residual couple from interaction of mass members 120a and 120b.

As is illustrated in FIG. 1, first mass member 120a and first counterbalance mass member 130a may be assembled to have an offset relative angular alignment. In addition, second mass member 120b and second counterbalance mass member 130b may also be assembled to have the same relative alignment offset. The relative alignment offset may be indicated by an angle θ (a real number in suitable units, such as radians or degrees) between a line representative of the orientation of first mass member 120a and another line representative of the orientation of first counterbalance mass member 130a.

In an embodiment in which θ is essentially equal to π (or 180 degrees), as is illustrated in FIG. 2, for example, the resultant force F, due to masses 120a and 120b, may be oriented substantially opposite to the resultant force F' due to masses 130a and 130b. As such, a net residual couple force is essentially zero when masses 120a and 120b are not aligned. Thus, first counterbalance mass member 130a and/or second counterbalance mass member 130b may be utilized to maintain linearity of the vibrational motion produced by the eccentric vibrator apparatus 100 when shafts 105a and 105b are counter rotating, as described in greater detail below with reference to FIGS. 11 to 14.

With further reference to FIG. 1, eccentric vibrator apparatus 100 includes a first rotor mechanism 140a that generates rotation of the first shaft 105a. Vibrator apparatus 100 also includes a second rotor mechanism 140b that generates rotation of second shaft 105b. In some embodiments, first rotor mechanism 140a may include a first rotor assembly (not shown) mechanically coupled to first shaft 105a, and a first stator assembly (not shown) electromagnetically coupled to the first rotor assembly. First rotor mechanism 140a may also include a first bearing assembly (not shown) mechanically coupled to first shaft 105a near first mass member 120a, and may further include a second bearing assembly (not shown) mechanically coupled to first shaft 105a near first counterbalance mass member 130a. Further, second rotor mechanism 140b may include a second rotor assembly (not shown) mechanically coupled to second shaft 105b, and a second stator assembly (not shown) electromagnetically coupled to the second rotor assembly. Second rotor mechanism 140b may also include a first bearing assembly (not shown) mechanically coupled to second shaft 105b near second mass member 120b, and may further include a second bearing assembly (not shown) mechanically coupled to second shaft 105b near second counterbalance mass members 130b.

In some embodiments, first rotor mechanism 140a may include a first feedback device such as an encoder device (not shown) attached to first shaft 105a. The first feedback device may provide one or more of first information indicative of a respective position of at least one mass member of first mass member 120a; second information indicative of the angular velocity ω of the first shaft 105a; or third information indicative of a rotation direction (such as clockwise direction or counterclockwise direction) of the first shaft 105a. A position of first mass member 120a is represented by an angle between 0 and 2π per revolution of the first shaft 105a, relative to a defined origin corresponding to a particular placement of the first shaft 105a. Rotor mechanism 140b may further include a second feedback device such as an encoder device (not shown) attached to second shaft 105b.

The second feedback device may provide one or more of first information indicative of a respective position of second mass member 120b; second information indicative of angular velocity ω of second shaft 105b; or third information indicative of a rotation direction of second shaft 105b. A position of second mass member 120b is represented by an angle between 0 and 2π per revolution of second shaft 105b, relative to a defined origin corresponding to a particular placement of the first shaft 105b.

First feedback device and second feedback device may be embodied as respective encoder devices. Each of the respective encoder devices may be embodied in or may include, for example, a rotary encoder device. A rotary encoder device may include, for example, a 1024 pulse-per-rotation rotary encoder device. An encoder device may include an essentially circular plate that rotates with the shaft (either the first shaft 105a or second shaft 105b).

The essentially circular plate may include openings alternating with solid sections. The openings and solid section partition the plate in multiple arcs of essentially equal length, subtending a defined angle Δy. The greater the number of openings in the encoder device, the smaller the value of Δy, and thus, the greater the angular position resolution of the encoder device. Each opening may represent a value of an angular position of the shaft. The encoder device may also include, for example, a light source device, a first sensor, and a second sensor. The light source device may illuminate the essentially circular plate, causing the first light sensor to provide an electric signal in response to being illuminated and further causing the second light sensor to provide another electric signal in response to being obscured by a solid section. As the shaft rotates, the first sensor and the second sensor provide respective trains of pulses that may be utilized to determine the angular velocity of the shaft, an angular position of the shaft, and/or a direction of rotation of the shaft. The disclosure is not limited to rotary encoder devices and other types of encoder devices may be utilized in various embodiments.

By controlling respective initial angles of rotation of first shaft 105a and rotation of second shaft 105b—and, thus, controlling a relative angle offset between such shafts—a direction of a resultant force generated by first mass member 120a and of second mass member 120b may be controlled. As such, a resultant force directed in a required or intended direction perpendicular to the axis 102 may be achieved by configuring and maintaining initial angles of, and associated relative angle offset between, the respective substantially circular motions of the first shaft 105a and second shaft 105b. Configurations of such initial angles may be performed during operation (with the mass member in movement) or at start up (with the mass members at rest) of the eccentric vibrator apparatus.

Figure 3A:
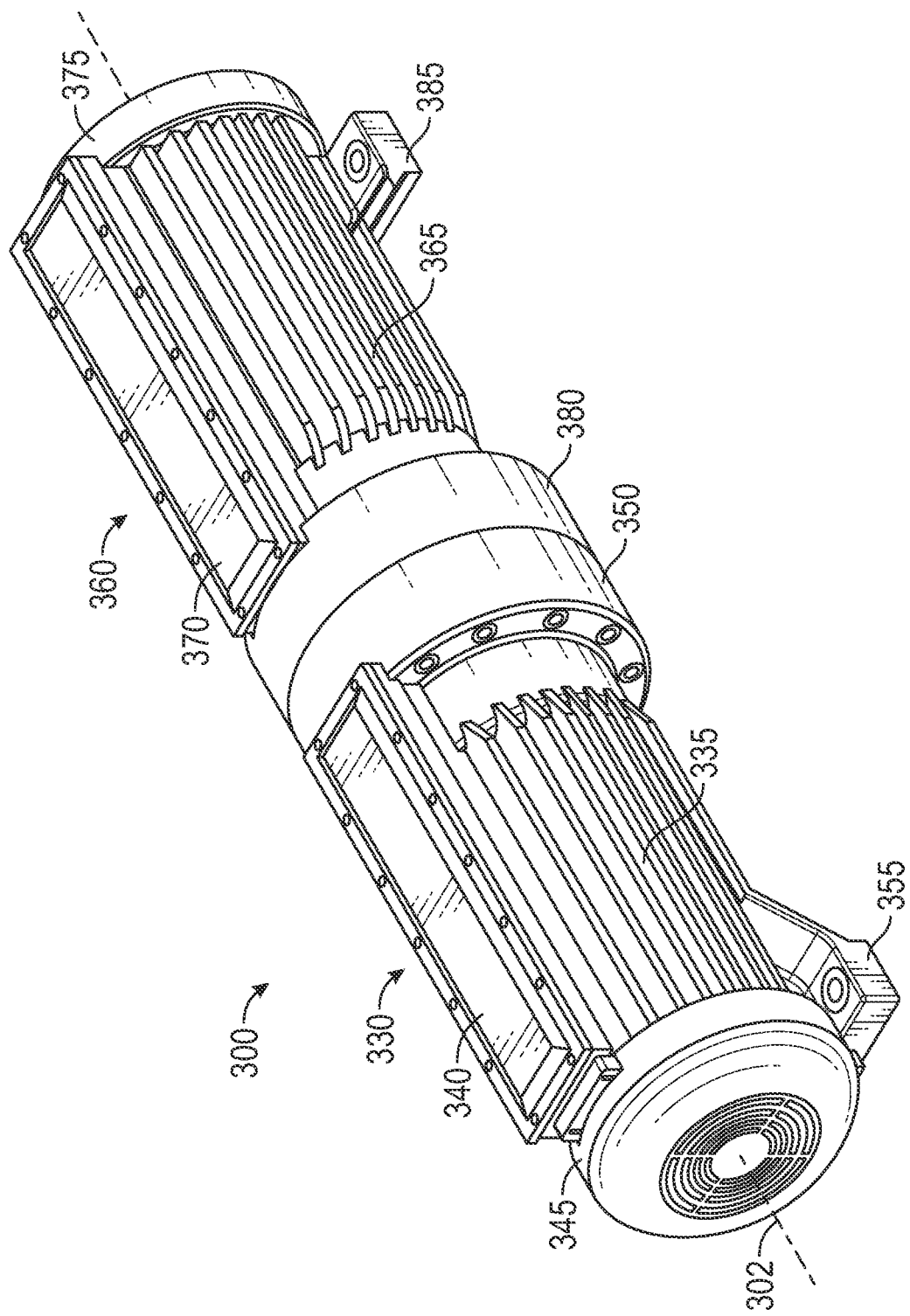
FIG. 3A is a perspective top view of an eccentric vibrator apparatus, in accordance with one or more embodiments of the disclosure.
Figure 3B:
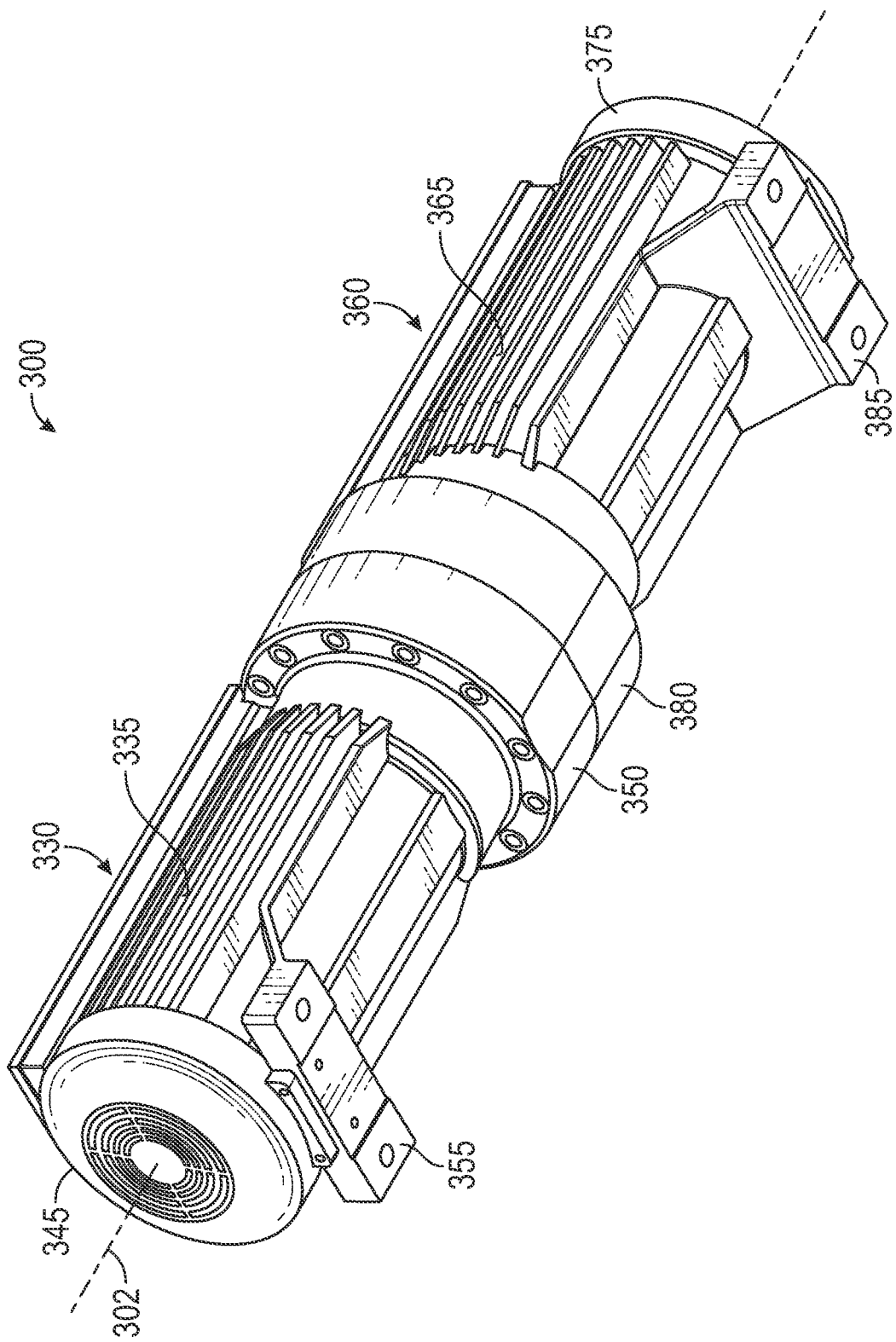
FIG. 3B is a perspective bottom view of the eccentric vibrator apparatus shown in FIG. 3A, in accordance with one or more embodiments of the disclosure.

FIGS. 3A and 3B show isometric views of an eccentric vibrator apparatus 300 in accordance with an embodiment of the disclosure. Vibrator apparatus 300 of FIG. 3A includes a housing assembly that is elongated along an axis 302. The housing assembly includes a first assembly 330 and a second assembly 360. First assembly 330 may house a first motor assembly (for example, motor assembly 110a of FIG. 1) and second assembly 360 may house a second motor assembly (for example, motor assembly 110b of FIG. 1). First assembly 330 may include a first motor case 335, a first cover plate 340 (which may be a junction box cover in some embodiments), and a first cover assembly 345. The first motor assembly (e.g., motor assembly 110a of FIG. 1) may be placed within first motor case 335. Second assembly 360 includes a second motor case 365, a second cover plate 370 (e.g., a junction box cover), and a second cover assembly 375. The second motor assembly (for example, motor assembly 110b of FIG. 2) may be placed within second motor case 365. Various materials may be utilized to manufacture first assembly 330 and second assembly 360. For example, any rigid material may be utilized, such as a metal (for example and without limitation, aluminum), a ferrous alloy (for example and without limitation, stainless steel), a non-ferrous alloy, another type of metallic alloy, etc. In other embodiments, a plastic may be utilized depending on the application (e.g., for consumer electronics).

As is illustrated in FIG. 3A, first motor case 335 includes a flange member 350 that has multiple openings that are configured to receive respective first fastening members. Similarly, second motor case 365 also includes a flange member 380 that also has multiple openings configured to receive respective second fastening members. The first fastening members and the second fastening members may respectively mate to allow assembly of first motor case 335 and second motor case 365 into a single unit via flange member 350 and flange member 380.

Figure 4:
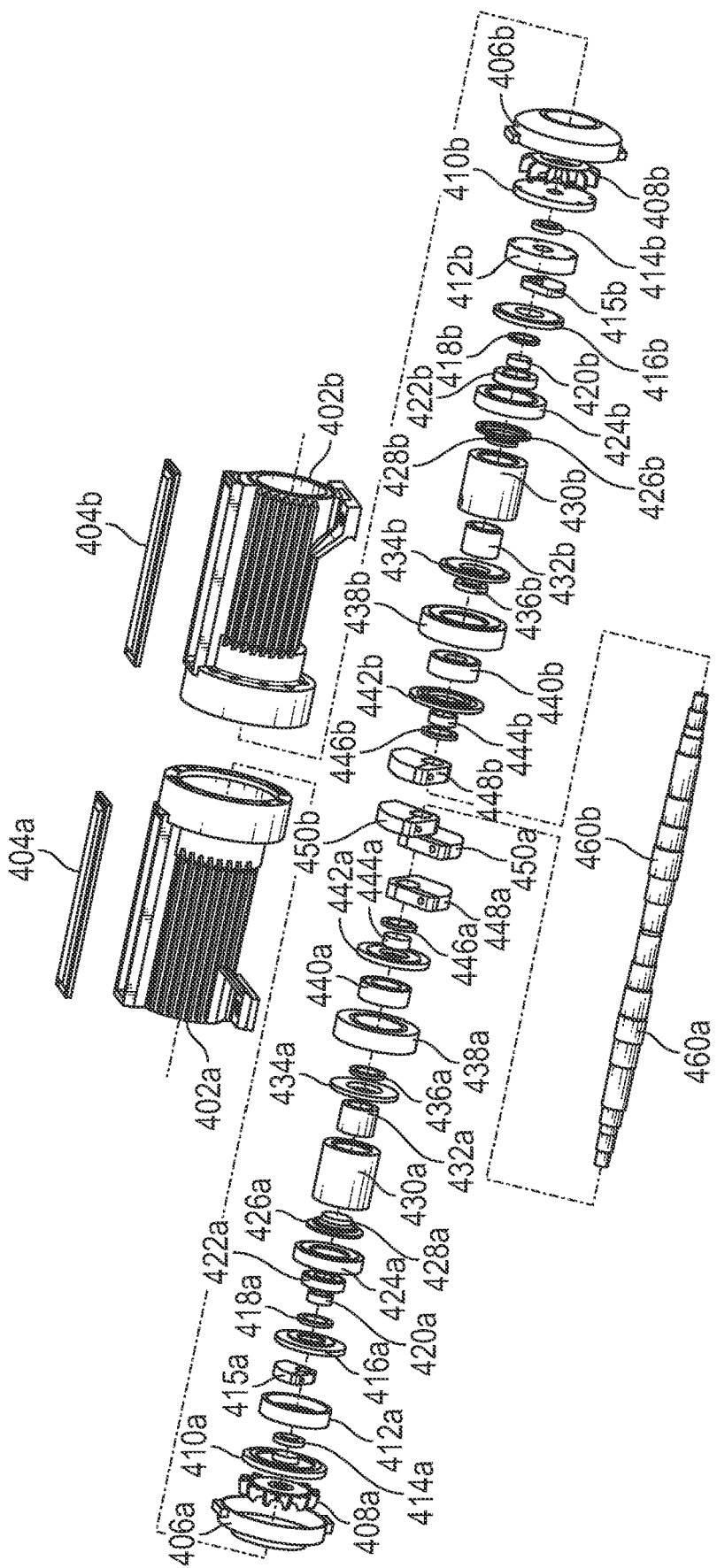
FIG. 4 is an exploded view of an eccentric vibrator apparatus, in accordance with one or more embodiments of the disclosure.

First motor case 335 may also include second flange members 355, having one or more openings configured to receive respective one or more fastening members. Second motor case 365 may also include second flange members 385, having one or more openings configured to receive respective one or more fastening members. Second flange members 355 and 385, along with the one or more fastening members in each one of the first motor case 335 and second motor case 365 may be configured to couple eccentric vibrator apparatus 300 to equipment. As mentioned, vibrator apparatus 300 may be coupled to industrial equipment, user equipment, consumer electronics, etc., to thereby generate vibrational motion in such equipment FIG. 4 illustrates an exploded view of eccentric vibrator apparatus 300 of FIGS. 3A and 3B, in accordance with one or more embodiments of the disclosure. As described above with reference to FIGS. 3A and 3B, eccentric vibrator apparatus 300 includes a first housing assembly with first motor case 335, first cover plate 340, and first cover assembly 345. Eccentric vibrator apparatus 300 also includes a second housing assembly with second motor case 365, second cover plate 370, and second cover assembly 375. Eccentric vibrator apparatus 300 also includes a first motor assembly and a second motor assembly, such as first motor assembly 110a and second motor assembly 110b of FIGS. 1 and 2. Parts included in such assemblies may form an arrangement that has inversion symmetry with respect to a plane that essentially bisects the eccentric vibrator apparatus 300, the plane being normal to a longitudinal axis along which the eccentric vibrator apparatus is aligned.

In this example, first motor assembly of the eccentric vibrator apparatus 300 may include a fan 408a; a motor end cover 410a; an encoder mounting ring 412a; an encoder 414a; and a first plurality of (counterbalance, or outboard) mass members 415a. The first motor assembly may also include a first bearing assembly having a seal housing 416a, a shaft seal 418a, a shaft seal ring 420a, a first (outboard) bearing 422a, and a first (outboard) bearing housing assembly 424a. The first motor assembly may further include a seal housing 426a; an additional shaft seal 428a; a stator assembly 430a; and a rotor assembly 432a.

The first motor assembly may still further include a second bearing assembly having a seal housing 434a, an additional shaft seal 436a, a second (inboard) bearing housing assembly 438a, a second (inboard) bearing 440a, a seal housing 442a, a shaft seal ring 444a, and an additional shaft seal 446a. The first motor assembly may also include a second mass member, including a mass member 448a and a second mass member 450a. While the second mass member is illustrated as having two mass members, the disclosure is not so limited. In further embodiments, more than two mass members or fewer than two mass members may be assembled. The first motor assembly may still further include a first shaft 460a oriented along the longitudinal axis 302 of the eccentric vibrator apparatus 300.

The second motor assembly of the eccentric vibrator apparatus 300 may include a fan 408b; a motor end cover 410b; an encoder mounting ring 412b; an encoder 414b; and a first plurality of (counterbalance, or outboard) mass members 415b. The second motor assembly may also include a first bearing assembly having a seal housing 416b, a shaft seal 418b, a shaft seal ring 420b, a first (outboard) bearing 422b, and a first (outboard) bearing housing assembly 424b. The second motor assembly may further include a seal housing 426b; an additional shaft seal 428b; a stator assembly 430b; and a rotor assembly 432b. The second motor assembly may still further include a second bearing assembly having a seal housing 434b, an additional shaft seal 436b, a second (inboard) bearing housing assembly 438b, a second (inboard) bearing 440b, a seal housing 442b, a shaft seal ring 444b, and a shaft seal 446b. The second motor assembly may also include a second mass member, including a mass member 448b and a mass member 450b. While the second mass member is illustrated as having two mass members, the disclosure is not so limited. In further embodiments, more than two mass members or fewer than two mass members may be assembled. The second motor assembly may still further include a second shaft 460b oriented along the longitudinal axis 302 of the eccentric vibrator apparatus 300.

Figure 5:
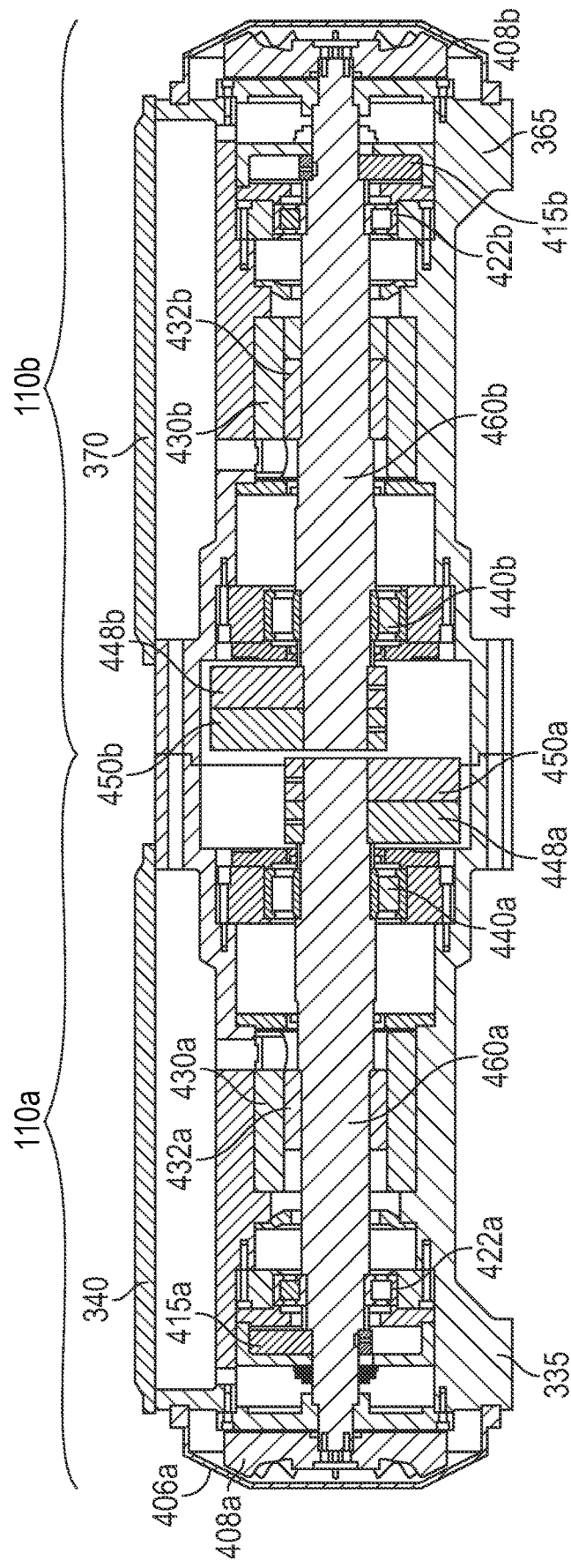
FIG. 5 is a cross-sectional view of the eccentric vibrator apparatus illustrated in FIGS. 3A and 3B, in accordance with one or more embodiments of the disclosure.

FIG. 5 is a cross-sectional view of eccentric vibrator apparatus 300 of FIGS. 3A, 3B, and 4, in accordance with one or more embodiments of the disclosure. As is illustrated, first plurality of (counterbalance, or outboard) mass members 415a is assembled to have an alignment offset of about π relative to mass members 448a and 450a. First plurality of (counterbalance) mass members 415b is assembled to have an alignment offset θ' of about −π relative to 448b and 450b. Further, alignment offset θ' between (i) the second mass member that includes mass members 448a and 450a, and (ii) the second mass member that includes mass members 448b and 450b may be adjustable. As such, an alignment offset θ' of about π that is shown in FIG. 5 is illustrative and other offsets may be configured.

FIG. 6A is a side view of vibratory system 600 that utilizes eccentric vibrator apparatus 300, in accordance with one or more embodiments of the disclosure. Vibratory system 600 includes a deck assembly 610 that is mechanically coupled to eccentric vibrator apparatus 300 by, for example, coordinated flange members and fastening members (e.g., flange members 355 and 385 of FIGS. 3A and 3B). During operation, eccentric vibrator apparatus 300 may generate a time-dependent force f(t). Thus, in operation, eccentric vibrator apparatus 300 may exert a time-dependent oscillatory force f(t) on the deck assembly 610, causing a time-dependent oscillatory mechanical motion of the deck assembly 610. The intensity and period of oscillation of the mechanical motion may be determined by the angular frequency ω of rotation of shafts in the eccentric vibrator apparatus 300 and by other mechanical parameters including moments of inertia.

An amplitude of time-dependent force f(t) may be determined, in part, by the angular velocity ω of the shafts in eccentric vibrator apparatus 300, by the respective resultant moments of inertia of a first mass member and a second mass member in the eccentric vibrator apparatus 300, and by the respective moments of inertia of a first counterbalance mass member and a second counterbalance mass member in eccentric vibrator apparatus 300. The time-dependent force f(t) may be oriented in a direction substantially perpendicular to the longitudinal axis of eccentric vibrator apparatus 300 (e.g., axis 102 in FIG. 1). As such, the time-dependent force f(t) may be represented as a three-dimensional vector $(f_x(t), f_y(t), f_z(t))$, where the vector component $f_z(t)$ may be substantially null and the time dependent force f(t) may be substantially equal to $(f_x(t), f_y(t), 0)$. In an example scenario in which the deck assembly 610 starts at rest and eccentric vibrator apparatus 300 is energized from an power-off state, f(t) may self-align, after a transient period (for example, about 500 ms), into a direction that passes through the position of a center of gravity (CG) 620 of the deck assembly, in the x-y plane.

Such a self-alignment may occur based on angular momentum conservation in vibratory system 600 after eccentric vibrator apparatus 300 is energized. Such alignment may be configured by choice of motor assembly, such as an assembly that includes an asynchronous motor (such as an induction motor) that allows slip between an input frequency and shaft speed. Such a motor may thereby produce torque without reliance on physical electrical connections to a rotor. Accordingly, an angle ϕ indicative of the orientation of the time-dependent force f(t) relative to a base side of the deck assembly 610 may be determined by the position of the eccentric vibrator apparatus 300 on the deck assembly 610, along the x direction in the coordinate system illustrated in FIG. 6A.

While the f(t) is illustrated as being strictly collinear with a line having an orientation ϕ, the actual f(t) generated by eccentric vibrator apparatus 300 traverses, over time, an ellipse having a semi-major axis parallel to the line having orientation ϕ and a semi-minor axis that is much smaller (such as one, two, or three orders of magnitude smaller) than the semi-major axis. Such an ellipse may be referred to as a "tight ellipse." Specifically, angle ϕ decreases as the coordinate of the eccentric vibrator apparatus 300 along the x axis increases (or, more colloquially, as the eccentric vibrator is moved forward on the deck assembly) and increases as the coordinate of the eccentric vibrator apparatus 300 along the x axis decreases (or as the eccentric vibrator is moved rearward). Angle ϕ and the magnitude |f(t)| may determine the respective magnitudes of vector components $f_x(t)$ and $f_y(t)$. For example, small $\phi$ (that is, a few degrees) may yield a large $f_x(t)$ and a small $f_y(t)$, whereas large $\phi$ (for example, several tens of degrees) may yield a small $f_x(t)$ and a large $f_y(t)$. Thus, the angle $\phi$ may be adjusted to control a conveyance rate or residence time of particulate matter or other types of solids on an x-z plane of deck assembly 610.

Figure 6B:
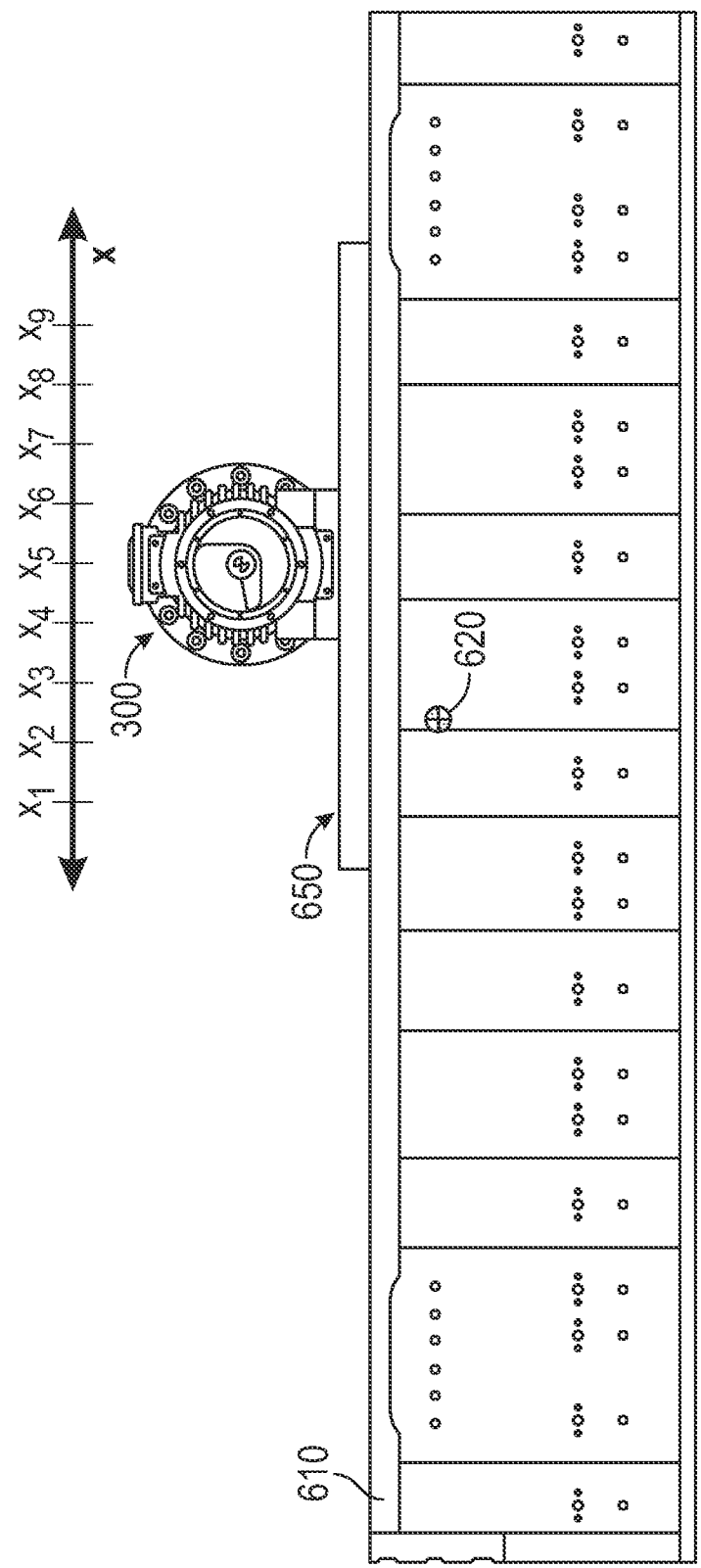
FIG. 6B is a side view of a vibratory system, in accordance with one or more embodiments of the disclosure.

Various mechanisms may be used to secure eccentric vibrator apparatus 300 on deck assembly 610. For example, as is illustrated in FIG. 6B, a fastening mechanism 650 may include a rail or another type of track mechanism that may permit moving the eccentric vibrator apparatus along the x axis. Fasteners, such as clamps, bolts, etc., may be used to secure eccentric vibrator apparatus 300 at a position along the x axis. Fastening mechanism 650 may allow eccentric vibrator apparatus 300 to be placed at various positions along deck assembly 610. Fastening mechanism 650 may include another type of rail or track mechanism that includes multiple locking mechanisms to secure eccentric vibrator apparatus 300 at preset positions along the x axis. For example, as is shown in FIG. 6B, defined positions may include positions $x_1$, $x_2$, $x_3$, $x_4$, $x_5$, $x_6$, $x_7$, $x_8$, and $x_9$, where respective locking mechanisms are configured. The disclosure is, of course, not limited to nine preset positions and more than nine positions or fewer than nine preset positions may be implemented. In some embodiments, multiple locking mechanisms may include one or more sawtooth members configured to engage other locking mechanisms included in a bottom surface of eccentric vibrator apparatus 300. In other embodiments, multiple locking mechanisms may include respective openings (threaded or otherwise) that may receive respective bolts that may mate with respective nuts to secure the eccentric vibrator apparatus at preset positions.

Figure 7A:
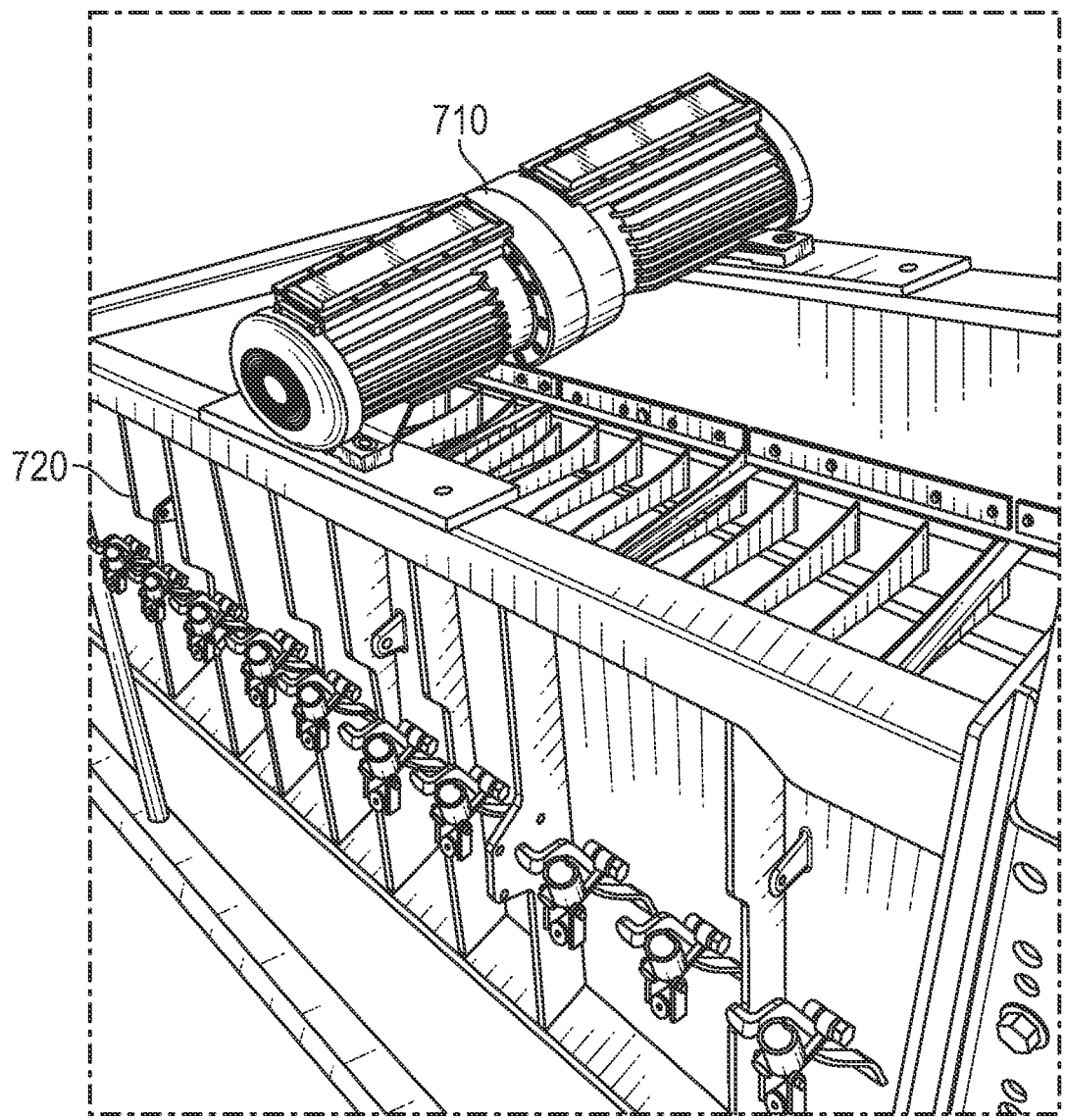
FIG. 7A is a perspective view of a vibratory system, in accordance with one or more embodiments of the disclosure.
Figure 7B:
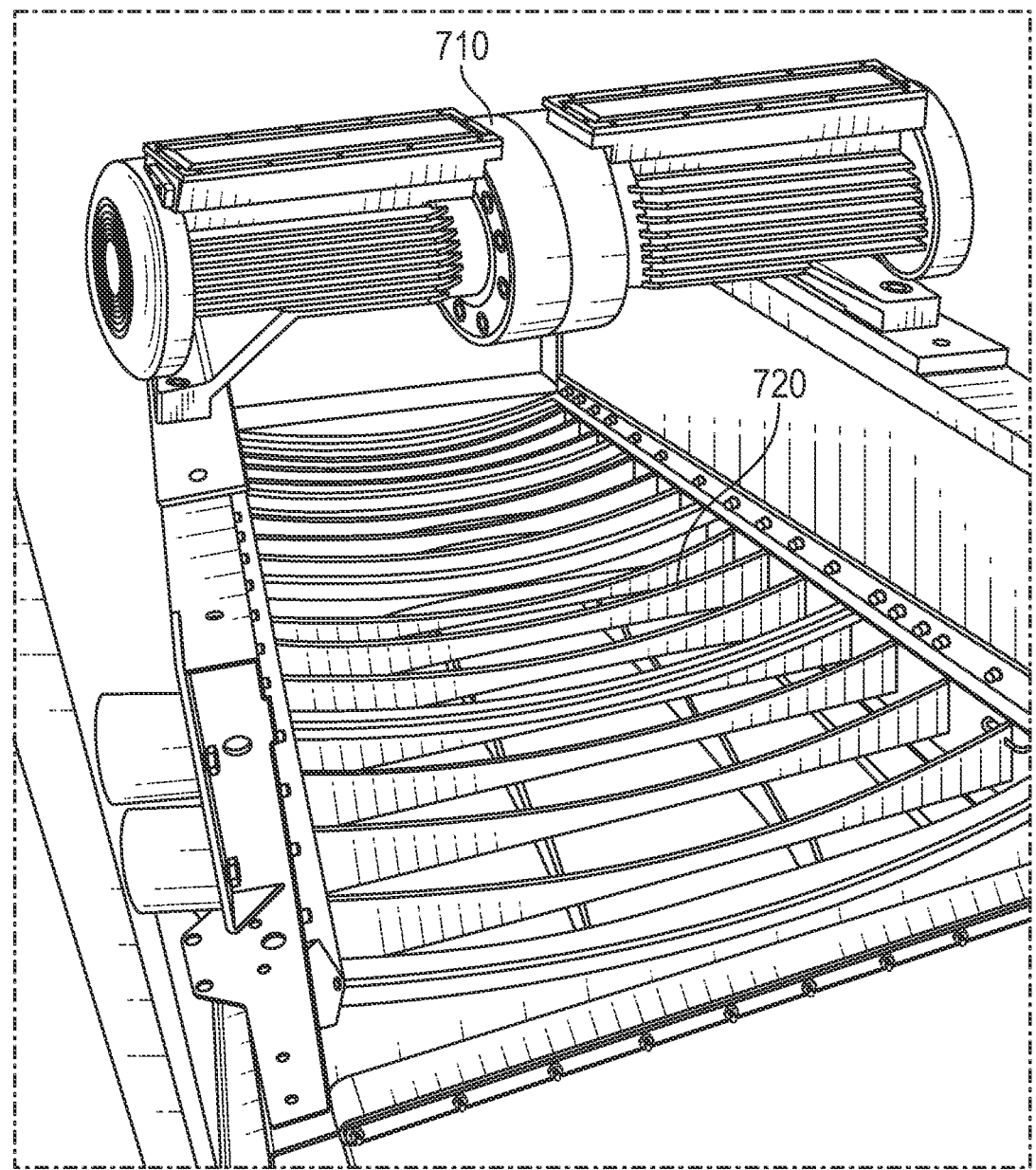
FIG. 7B is a perspective view of a vibratory system, in accordance with one or more embodiments of the disclosure.

FIGS. 7A and 7B are perspective views of an example vibratory system that utilizes an eccentric vibrator apparatus 710, in accordance with one or more embodiments of the disclosure. As is illustrated, eccentric vibrator apparatus 710 is mounted in a deck assembly 720 of separator equipment.

In some embodiments, an orientation of oscillation and a magnitude of the resultant force exerted by an eccentric vibrator apparatus may be configured without reliance on changes to the position at which the eccentric vibrator apparatus is mounted. In this regard, a control system may be functionally coupled to eccentric vibrator apparatus 710 to control motion of mass members and shafts included in eccentric vibrator apparatus 710.

Figure 8:
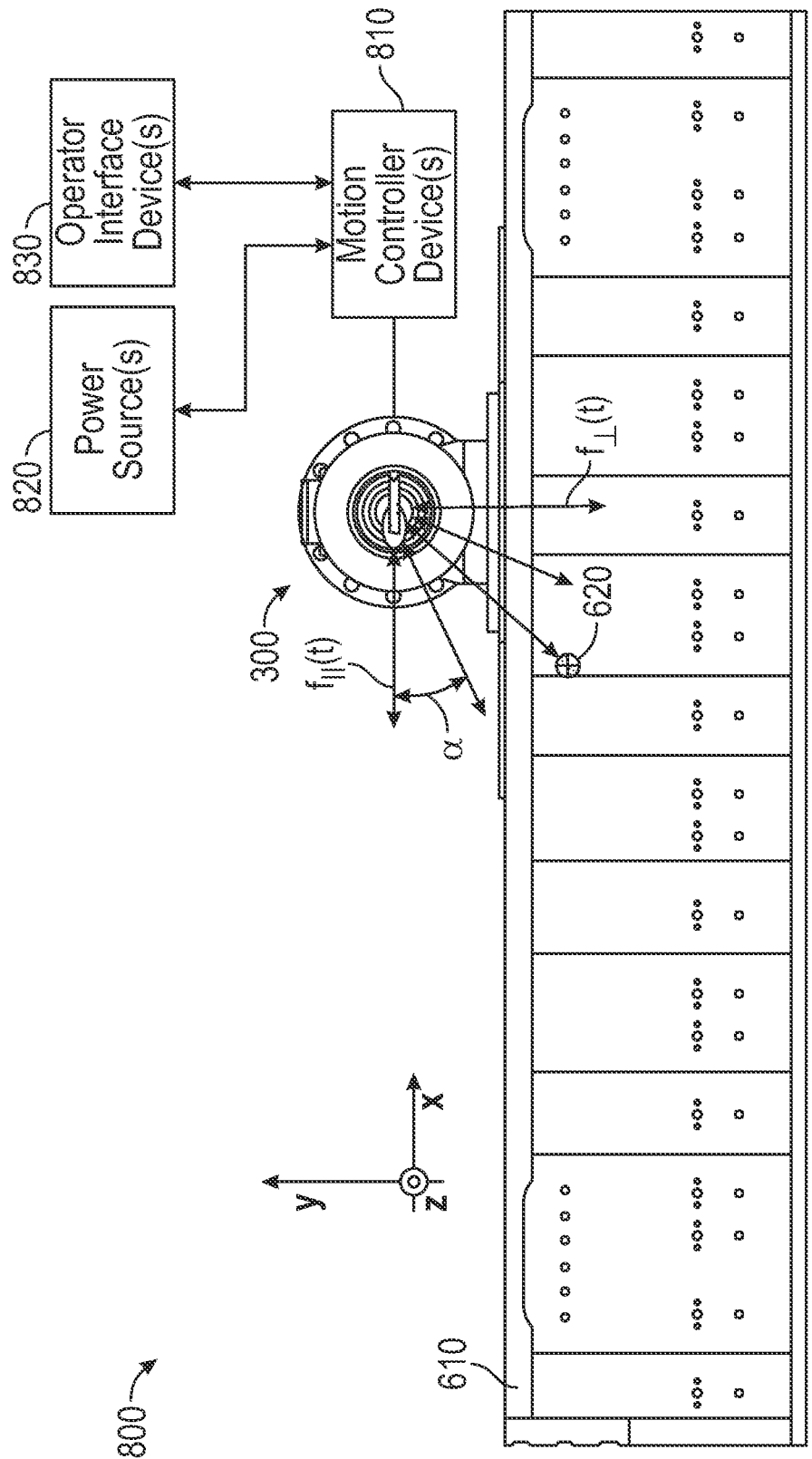
FIG. 8 is a diagram of a vibratory system, in accordance with one or more embodiments of the disclosure.

FIG. 8 is a diagram of a vibratory system 800 that includes a control system functionally coupled to eccentric vibrator apparatus 300, in accordance with one or more embodiments of the disclosure. The control system includes one or more operator interface devices 830 and one or more motion controller devices 810. Vibratory system 800 also includes one or more power sources 820 that may energize the motor assemblies included in eccentric vibrator apparatus 300 and/or at least one device of the control system. Power source(s) 820 may include one or more power supplies and/or a utility power source. Operator interface device(s) 830 may include input/output (I/O) interface device(s), such as a human machine interface (HMI), which may allow selection of a desired mode of vibration (for example, substantially linear excitation or substantially elliptical or circular excitation).

Operator interface device(s) 830 may further allow real-time monitoring or intermittent monitoring at particular instants. A mode of vibration may include a defined orientation and a defined magnitude of a time-dependent force $f(t)$ exerted by eccentric vibrator apparatus 300. The defined orientation is represented by an angle $\alpha$ in FIG. 8. As is illustrated, $\alpha=0$ would correspond to a time-dependent force $f_\parallel(t)$ essentially aligned along an x direction. Stated differently, $f_{81}(t)$ is essentially parallel to a base side of the of deck assembly 610. As is further illustrated, $\alpha=\pi/2$ would correspond to a time-dependent force $f_\perp(t)$ that is essentially vertical, along a y direction, where $f_\perp(t)$ is essentially perpendicular to the base side of the of deck assembly 610.

Configuration of a mode of operation may include the configuration of a defined angular frequency of rotation of a shaft of eccentric vibrator apparatus 300 and/or the configuration of a defined angular offset between a first eccentric mass member of a first motor assembly and a second eccentric mass member of a second motor assembly. An operator interface device 830 may receive input information indicative of a desired angle $\alpha$, angular frequency $\omega$, and/or angular offset. The input information may be used to configure a motion controller device 810 to control vibratory motion of eccentric vibrator apparatus 300. While the resultant $f(t)$ generated by eccentric vibrator apparatus 300 is illustrated as being linear with an orientation $\alpha$, the actual $f(t)$ generated by eccentric vibrator apparatus 300 traverses, over time, an ellipse having a semi-major axis parallel to the line having the slope $\alpha$ and a semi-minor axis that is much smaller (for example, one, two, or three orders of magnitude smaller) than the semi-major axis.

Depending on desired screen performance, angle a (which may also be referred to as tight-ellipse angle) may be configured to induce slow conveyance of material to be screened, to thereby maximize discharge dryness. Alternatively, angle a may be configured to induce fast conveyance to material to be screened, to thereby increase machine handling capacity, or may be configured to momentarily reverse conveyance of material to thereby dislodge stuck particles (i.e., for de-blinding).

Further, angle a may be adjusted during operation, as described herein, to an angle $\alpha'$ of about 90° for a defined period of time to attain temporary deblinding of a screen in a screening apparatus. After the defined period, $\alpha'$ of about 90° may be readjusted to $\alpha$. Further temporary changes to a mode of operation may be implemented in various embodiments. In one example, a transition from an angle $\alpha_0$ of about 45° to angle $\alpha'$ of about 60° may be made to slow conveyance and to cause a drier discharge from a slurry fed into a deck assembly having eccentric linear vibrator 300. Subsequently, a transition from $\alpha'$ of about 60° to $\alpha_0$ of about 45° may be implemented to resume faster conveyance. In another example, an angle $\alpha$ of approximately 45° may be adjusted during operation, as described herein, to an angle $\alpha'$ of about 30° for a defined period of time to remove accumulated matter on a screen. After the defined period of time, $\alpha'$ of about 30° may be readjusted to $\alpha$.

Such an adjustment may be desirable in operation of a screening machine to screen a slurry. During screening, slurry material transforms from a liquid-solid mixture to a dewatered solid. Angle $\alpha$ may be adjusted to increase dryness. For example, if the angle $\alpha$ is increased from about 45° to approximately 60°, as described above, a flow rate of the material on the screening decreases. This decrease in flow rate permits more time for liquid to be driven out of the slurry as the material moves more slowly towards a discharge end of the screening machine.

Figure 9:
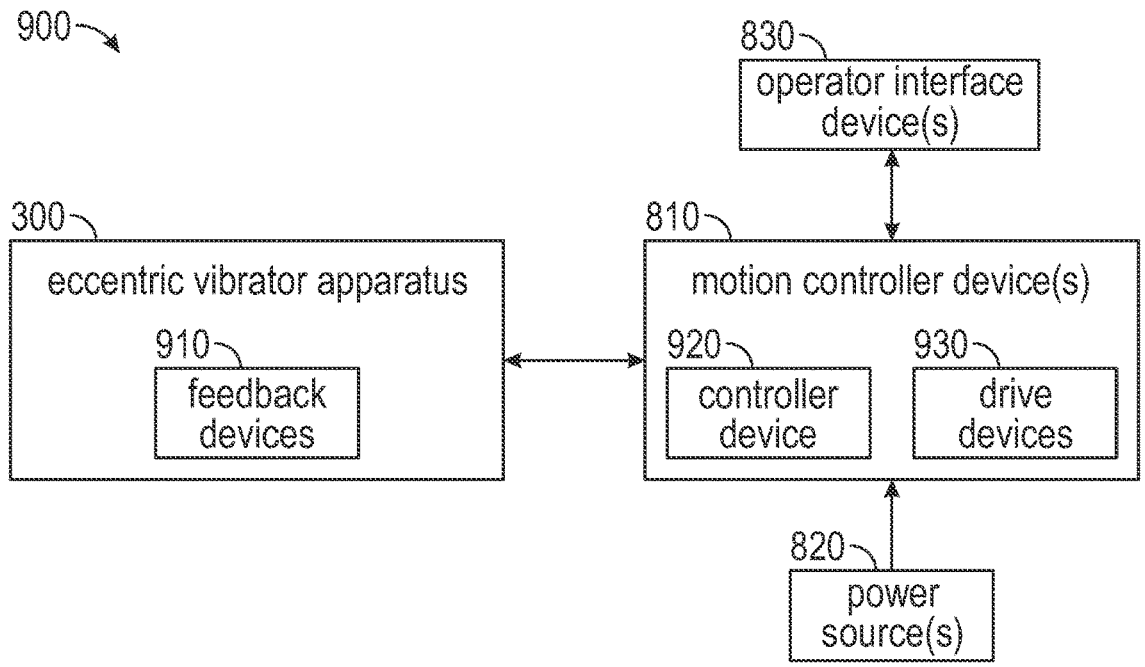
FIG. 9 is a schematic illustration of an eccentric vibrator apparatus coupled to a control system, in accordance with one or more embodiments of the disclosure.

FIG. 9 is a schematic illustration of a system that may include motion controller device(s) 810, a controller device 920, and drive devices 930. Controller device 920 may be embodied in or may include a programmable logic controller (PLC), a microcontroller, etc., and drive devices 930 may be embodied in or may include electronic motor drives, variable frequency drives (VFDs), etc. Controller device 920 may receive information indicative of position, velocity of eccentric mass members, and/or of direction of rotation of eccentric vibrator apparatus 300. Controller device 920 may control drive devices 930 to generate a specific mode of operation. In this regard, feedback devices 910 may be coupled to respective shafts of eccentric vibrator apparatus 300 and may provide first information indicative of respective positions of mass members.

Feedback devices 910 may also provide second information indicative of respective angular velocities of the shafts. Feedback devices 910 may provide third information indicative of a direction of rotation of a shaft of eccentric vibrator apparatus 300. In one embodiment, the first information, the second information, and the third information may be provided directly to controller device 920. In another embodiment, the first information, the second information, and the third information may be provided indirectly to controller device 920, where such information is provided to respective drive devices 930, and relayed by drive devices 930 to controller device 920. Controller device 920 may control drive devices 930 to generate rotational movement of at least one of the collinear shafts of eccentric vibrator apparatus 300.

Feedback devices 910 may include a first feedback device (such as a first encoder device) attached to a first shaft of eccentric vibrator apparatus 300. The first feedback device may send one or more of (a) first information indicative of a respective position of at least one of first mass members of eccentric vibrator apparatus 300, (b) second information indicative of angular velocity of the first shaft, or (c) third information indicative of a direction of rotation of the first shaft. Feedback devices 910 may also include a second feedback device (such as a second encoder device) attached to a second shaft of vibrator apparatus 300. The second feedback device may send one or more of (a) fourth information indicative of a respective position of at least one of second mass members of eccentric vibrator apparatus 300, (b) fifth information indicative of angular velocity of the second shaft, or (c) sixth information indicative of direction of rotation of the second shaft.

Controller device 920 may further receive the first information, the second information, the third information, the fourth information, the fifth information, the sixth information, and operator interface device 830 information and may direct drive devices 930 to configure rotational movement of the first shaft and second shaft based at least on the received information. In an embodiment, controller device 920 may receive such information directly from the first feedback device and the second feedback device. In another embodiment, controller device 920 may receive the first information, the second information, the third information, the fourth information, the fifth information, and/or the sixth information indirectly, where such information is provided to drive devices 930, and relayed by drive devices 930 to controller device 920.

Drive devices 930 may include a first drive device coupled to a first motor assembly including the first shaft of eccentric vibrator apparatus 300. Controller device 920 may direct the first drive device to generate the rotational movement of the first shaft based on one or more of a portion of the first information; a portion of the second information; a portion of the third information and operator interface device 830 information. Drive devices 930 may also include a second drive device coupled to a second motor assembly including the second shaft of eccentric vibrator apparatus 300. Controller device 920 may direct the second drive device to configure the rotational movement of the second shaft based on one or more of a portion of the fourth information; a portion of the fifth information; a portion of the sixth information and operator interface device 830 information.

Figure 10A:
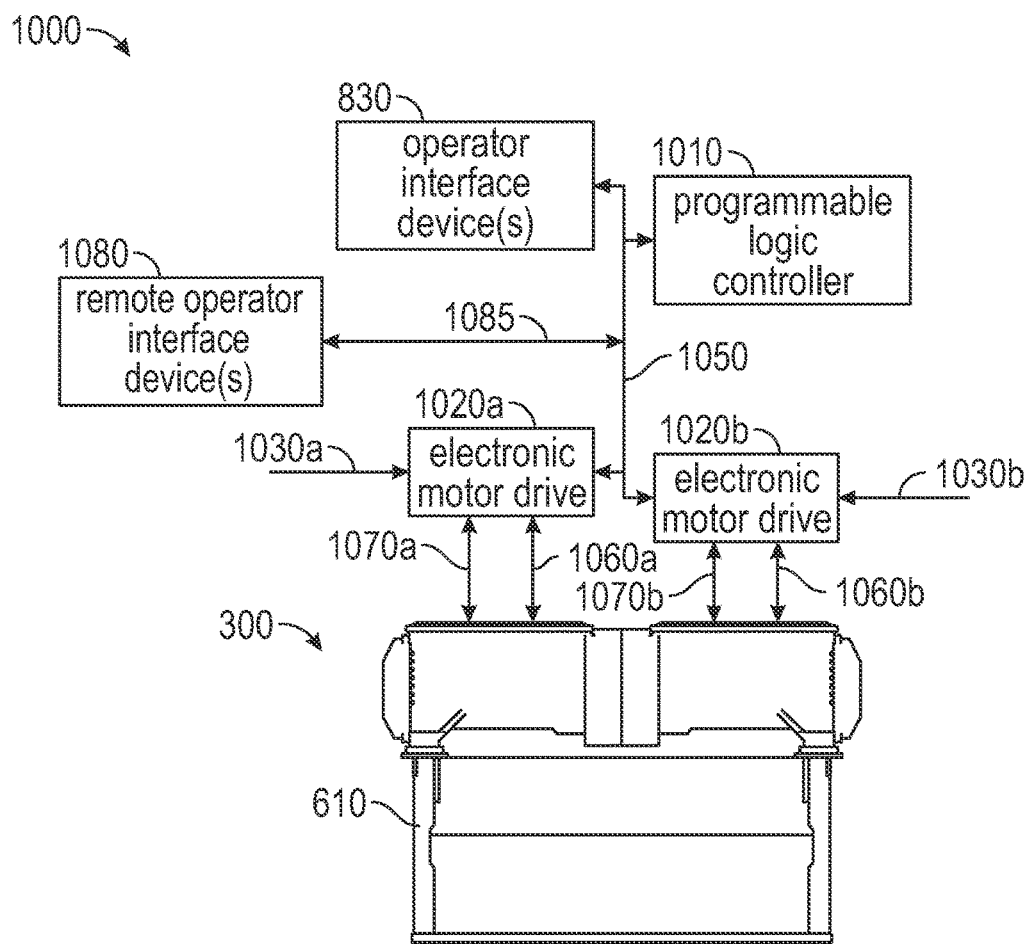
FIG. 10A is a schematic illustration of an eccentric vibrator apparatus coupled to a control system, in accordance with one or more embodiments of the disclosure.

FIG. 10A is a schematic illustration of an eccentric vibrator apparatus 1000 coupled to a control system, in accordance with one or more embodiments of the disclosure. As illustrated in FIG. 10A, system 1000 may include a controller device 1010 that may be embodied in or may include a programmable logic controller. In addition, drive devices 930 (e.g., see FIG. 9) may be embodied in or may include a first electronic motor drive 1020A and a second electronic motor drive 1020B. The disclosure is not limited to electronic motor drives that share a common architecture. First electronic motor drive 1020A and second electronic motor drive 1020B may power respective motor assemblies in eccentric vibrator apparatus 300. In this regard, first electronic motor drive 1020A may include an electronic inverter or another type of power supply coupled (for example, electromechanically coupled) to a first motor assembly by, for example, a power line assembly 1060A. Second electronic motor drive 1020B may include an electronic inverter or another type of power supply coupled to a second motor assembly by a second power line assembly 1060B.

First and second power line assemblies 1060A and 1060B may include, for example, an electrical conductor, power connectors, insulating coatings, etc. First electronic motor drive 1020A and second electronic motor drive 1020B may be coupled to respective power lines 1030A and 1030B that are connected to a utility power source (such as a 50 Hz AC power source or a 60 Hz AC power source). Further, first electronic motor drive 1020A may be coupled (electrically or electromechanically) to the first feedback device of eccentric vibrator apparatus 300 by a first bus 1070A. Second electronic motor drive 1020B may also be coupled (electrically or electromechanically) to a second bus 1070B. First and second bus structures 1070A and 1070B allow transmission of information (analog and/or digital) that may represent angular position, angular velocity, and/or direction of rotation of a shaft of eccentric vibrator apparatus 300. The disclosure is not limited to buses that share a common architecture.

As is further illustrated in FIG. 10A, system 1000 may further include operator interface device(s) 830 and remote operator interface device(s) 1080. Operator interface device(s) 830, programmable logic controller 1010, first electronic motor drive 1020A, and second electronic motor drive 1020B may be coupled by network devices 1050 (such as a high-speed network device or bus). Network devices 1050 may allow exchange of information (for example, data and/or signaling) between operator interface device(s) 830, programmable logic controller 1010, first electronic motor drive 1020A, and second electronic motor drive 1020B. One or more of remote operator interface device(s) 1080 may be coupled to a network device 1050 via wireless links and/or wired links 1085. Device(s) 1080 may allow configuration and/or monitoring of operation of eccentric vibrator apparatus 300.

Figure 10B:
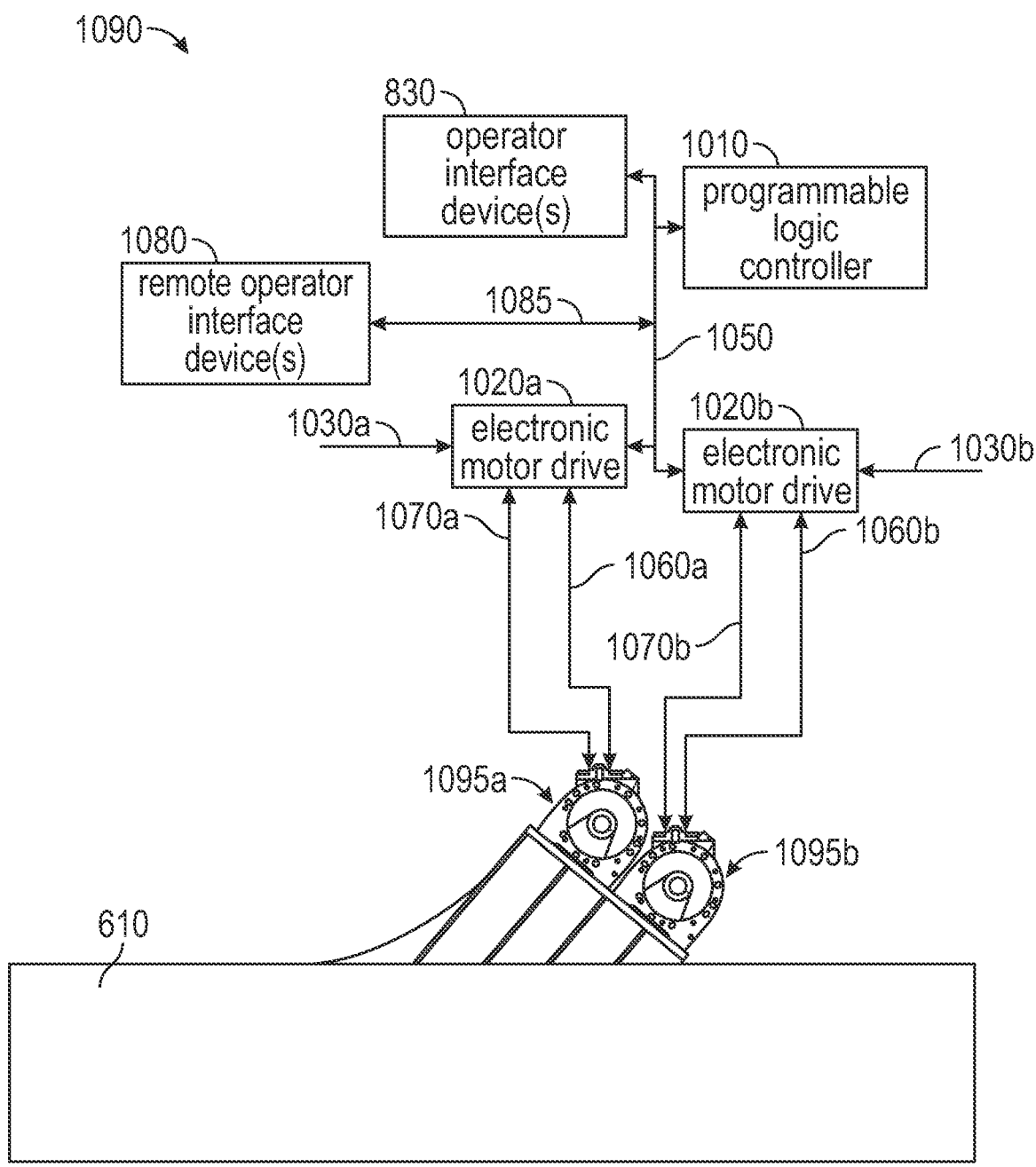
FIG. 10B is a schematic illustration of a vibrator apparatus coupled to a control system, in accordance with one or more embodiments of the disclosure.

FIG. 10B is a schematic illustration of a vibratory system 1090 having a control system that is functionally coupled to other types of eccentric motors to thereby control a type of motion generated by the eccentric motor. For example, a control system may be functionally coupled to conventional eccentric motors 1095a and 1095b, such as eccentric motors that do not include collinear shafts. A mode of rotation (for example, magnitude of angular velocity and direction of rotation) of each one of the conventional motors 1095a and 1095b may be controlled independently, according to an embodiment. For example, to generate an essentially linear mechanical excitation, a PLC 1010 may direct a first electronic motor drive 1020A to cause eccentric motor 1095a to rotate in a first direction at an angular velocity ω. PLC 1010 may further direct a second electronic motor drive 1020B to cause eccentric motor 1095b to rotate in a second direction opposite the first direction, at the angular velocity ω. In another example, to generate an essentially circular mechanical excitation, PLC 1010 may direct first electronic motor drive 1020A to cause eccentric motor 1095a to rotate in a first direction at an angular velocity ω. PLC 1010 may further direct second electronic motor drive 1020B to cause eccentric motor 1095b to rotate in the first direction as well, at the angular velocity ω.

As described above, control system that includes motion controller device(s) 810 (e.g., see FIG. 8) may generate a predetermined mode of operation of a disclosed eccentric vibrator apparatus. The control system may configure and/or monitor the respective movements—such as respective angular velocities and angular positions—of collinear shafts included in the eccentric vibrator apparatus independently and continuously, nearly continuously, or at specific times (for example, periodically, nearly periodically, or according to a schedule). For example, a mode of operation may be monitored and/or configured as desired in nearly real time (or essentially periodically, at time intervals significantly shorter than, such as a hundredth part, a thousandth part, a millionth part, and so forth, of a period of revolution 1/ω of a shaft of the apparatus) without powering off the eccentric vibrator apparatus. In this regard, motion controller device (s) 810 may employ various techniques, including electronic gearing to configure the angular velocity and/or angular position of a shaft during operation of the eccentric vibrator apparatus, without needing to power down the eccentric vibrator apparatus to perform a reconfiguration operation.

As described above, the control system may be configured to set and maintain a relative angle offset between respective rotational movements of collinear shafts of an eccentric vibrator apparatus. In this regard, the control system may impose respective initial angles of respective rotational movements of the collinear shafts. The respective initial angles may be defined relative to a reference coordinate system and may determine an orientation of oscillation of a resultant force f(t) (an essentially sinusoidal force) produced by the eccentric vibrator apparatus. The orientation may be represented by an angle relative to a defined direction in a reference coordinate system. For example, the reference coordinate system may be a Cartesian system having an axis (for example, a z-axis as shown in FIG. 8) essentially parallel to the longitudinal axis of the eccentric vibrator apparatus. A direction representing an orientation of the oscillation of the resultant force f(t) may lie in a plane (e.g., in the x-y of FIG. 8) that is normal to the z axis.

FIGS. 11-14 illustrate schematic force diagrams for four respective configurations of initial angles and associated relative angle offsets, at nine different instants during operation of an eccentric vibrator apparatus 1100 in accordance with embodiments described herein.

Figure 11:
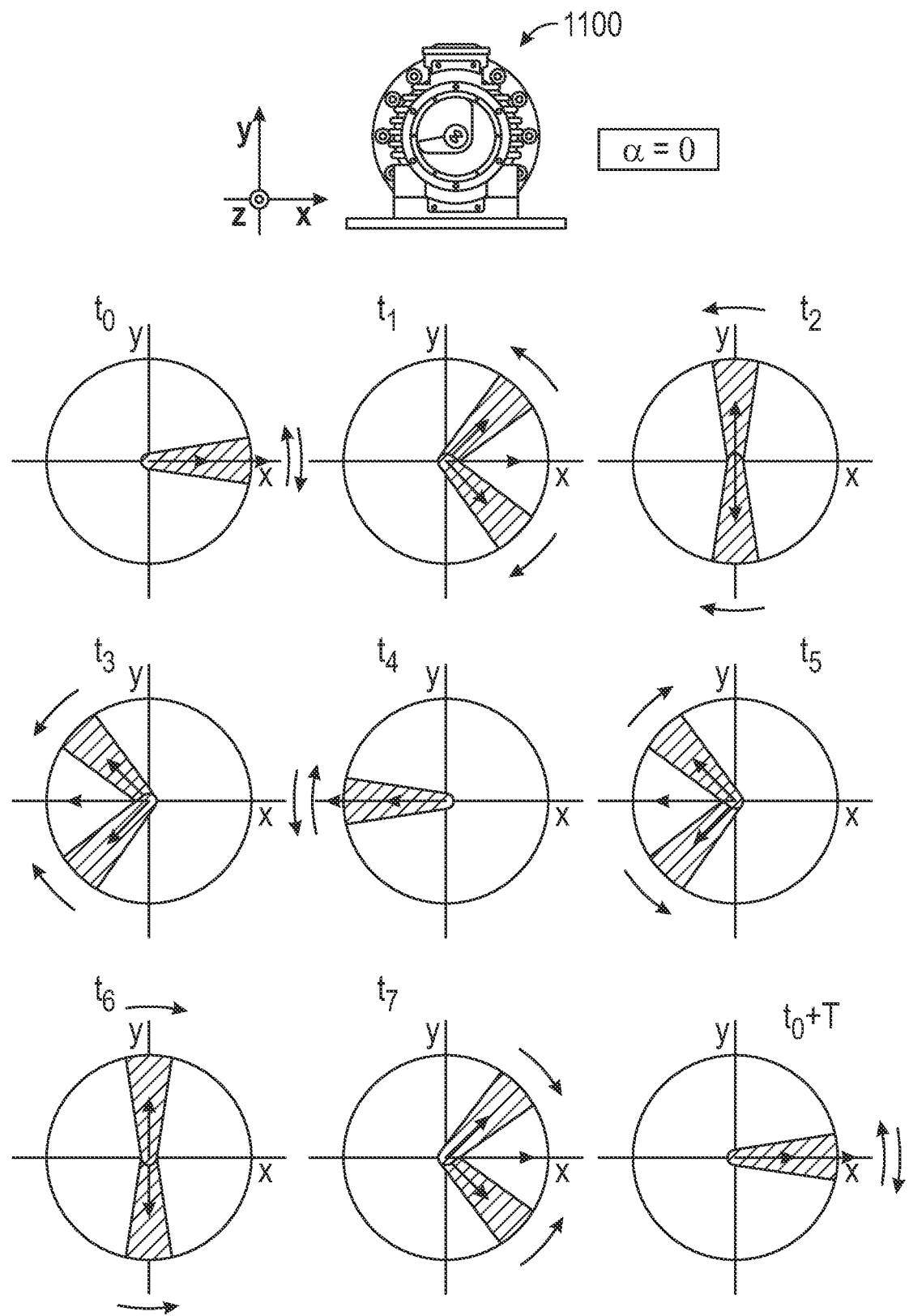
FIG. 11 illustrates time-dependent forces between mass members of an eccentric vibrator apparatus, in accordance with one or more embodiments of the disclosure.

FIG. 11 illustrates force configurations at instants $t_0$, $t_1$, $t_2$, $t_3$, $t_4$, $t_5$, $t_6$, $t_7$, and $t_0+T$ for initial angles equal to 0 for both collinear shafts in eccentric vibrator apparatus 1100, resulting in a relative angle offset essentially equal to 0. At any given instant, forces are indicated by arrows within the circle, and shaded regions indicate positions of respective masses. Arrows external to the circle indicate velocities. Forces corresponding to respective pluralities of mass member are represented with thin arrows, and resultant forces F are represented with thick arrows. In this example, angles are defined relative to the Cartesian coordinate system shown in FIG. 11, and T represents a period of the rotation of the collinear shafts. For the initial angular configuration and associated relative angle offset of this example, a first mass member of eccentric vibrator apparatus 1100 may be essentially aligned with a second mass member at angles 0 and π, as is illustrated by the diagrams corresponding to $t_0$ and $t_4$.

At each instant, the force exerted by a given mass (e.g., shown by a thin arrow in the circle) is essentially perpendicular to the velocity (e.g., shown by an arrow outside of the circle) of the mass members. The masses generate forces that share a common magnitude. For example, a first mass member and a second mass member may exert, respectively, a force $F_a$ and a force $F_b$, where $|F_a|=|F_b|$. As shown in FIG. 11, for initial angles essentially equal to 0, the resultant force f(t) may be oriented along the x direction, or parallel to a base of the eccentric vibrator apparatus 1100. Further, forces cancel at instants $t_2$ and $t_6$ and point in the negative x direction at instant $t_4$. The configuration of FIG. 11 therefore causes horizontal, side-to-side vibration of equipment (such as a deck assembly or screen basket) onto which the force is exerted. For instance, a screen frame or deck assembly may vibrate with oscillations in a plane that is essentially horizontal.

Figure 12:
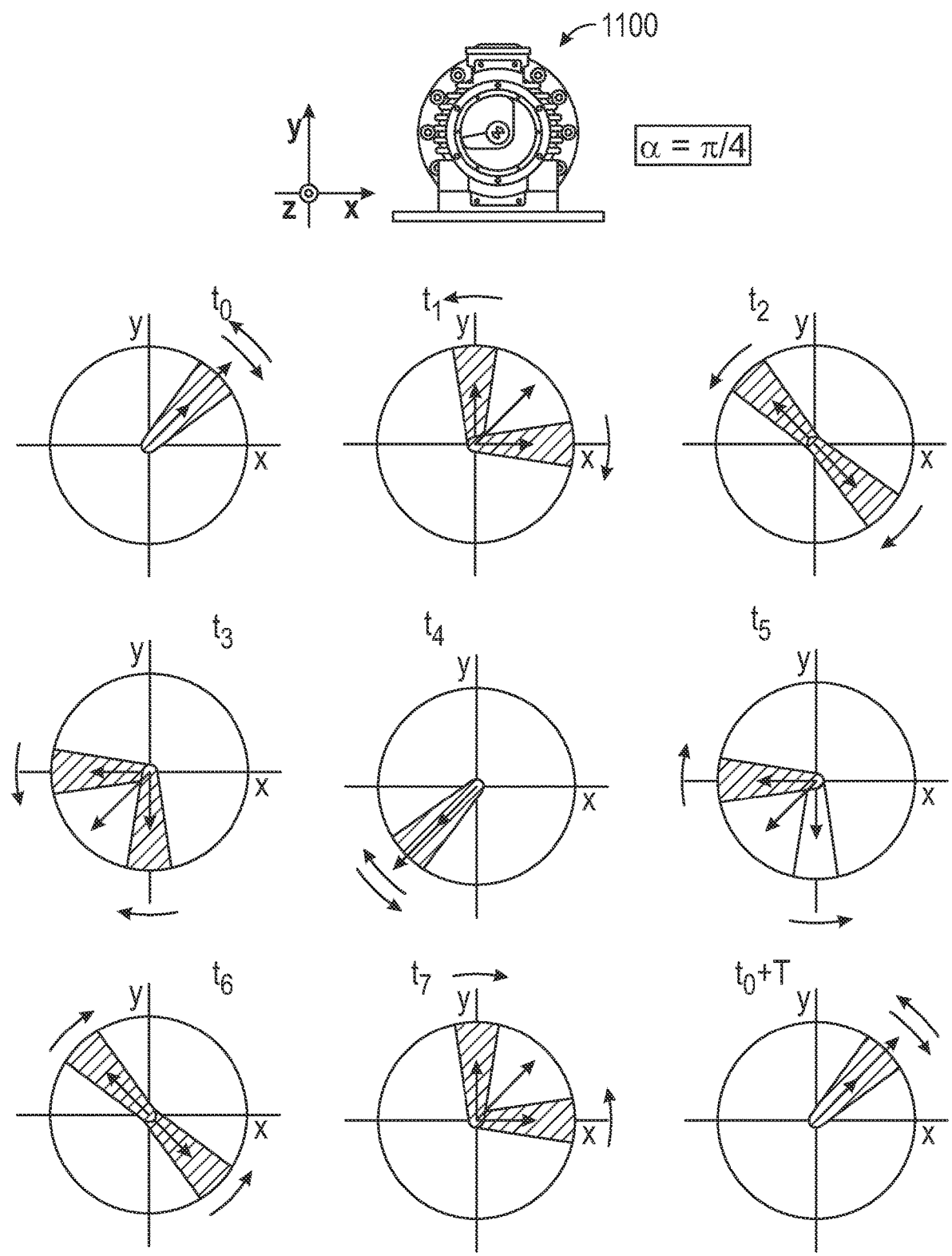
FIG. 12 illustrates time-dependent forces between mass members of an eccentric vibrator apparatus, in accordance with one or more embodiments of the disclosure.

FIG. 12 illustrates a second mode of vibration in which a linear oscillation is oriented at an angle with respect to the horizontal, in accordance with an embodiment of the disclosure. In this example, the control system may momentarily delay the first shaft and momentarily increase speed of the second shaft of the eccentric vibrator apparatus, thus configuring respective initial angles of the first shaft and the second shaft that yield a relative angle offset approximately equal to π/4 (set $t_2$ equal to $t_0$ in FIG. 12). In FIG. 12, one of the mass members may be advanced, for example, by π/4 and the other one of the mass members may be delayed, for example, by π/4. Therefore, the first mass member may be essentially aligned with the second mass member at angles π/4 and 5π/4, as is illustrated by the diagrams corresponding to to7 and $t_4$. For such initial angles and associated relative angle offset, the resultant force f(t) may be oriented at about π/4 relative to the base of the eccentric vibrator apparatus 1100.

Figure 13:
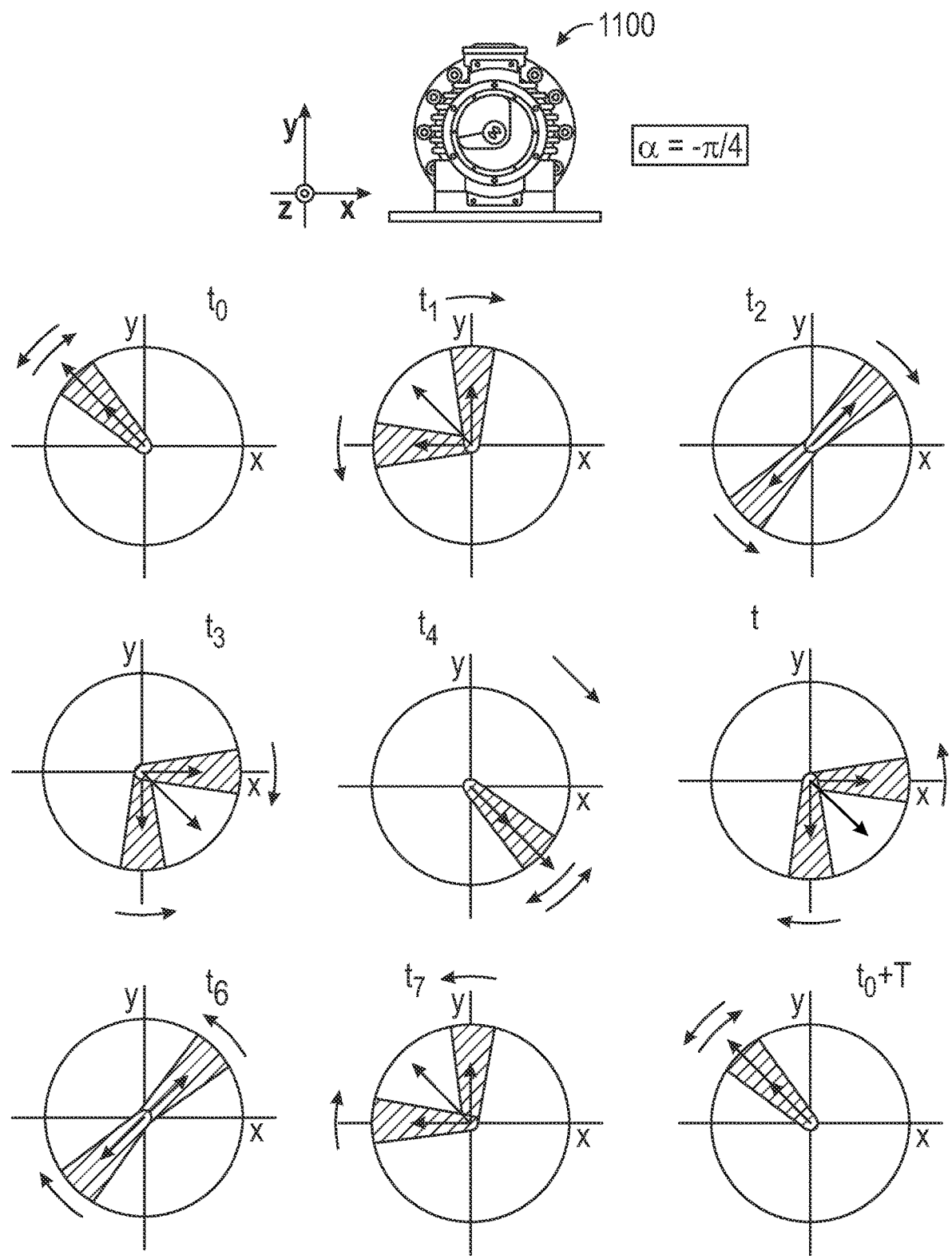
FIG. 13 illustrates time-dependent forces between mass members of an eccentric vibrator apparatus, in accordance with one or more embodiments of the disclosure.

FIG. 13 illustrates a third mode of vibration in which a linear oscillation is oriented at an angle with respect to the horizontal, in accordance with an embodiment of the disclosure. By setting the initial angles of rotation of the first shaft and the second shaft to be approximately 3π/4, a relative angle offset of about 3π/4 may be attained, as is shown in FIG. 13 (set $t_2$ equal to $t_0$ in FIG. 13). In this example, the first mass member may be essentially aligned with the second mass member at angles 3π/4 and 7π/4, as is illustrated by the diagrams corresponding to instants $t_0$ and $t_4$ in FIG. 13. Thus, rotating the orientation of oscillation of the resultant force f(t) by an angle π/2 relative to the orientation for a relative angle offset of π/4 (see FIG. 12), causing such a force to be essentially aligned with the other diagonal of the x-y plane of the Cartesian coordinate system relative to the motion of FIG. 12.

Figure 14:
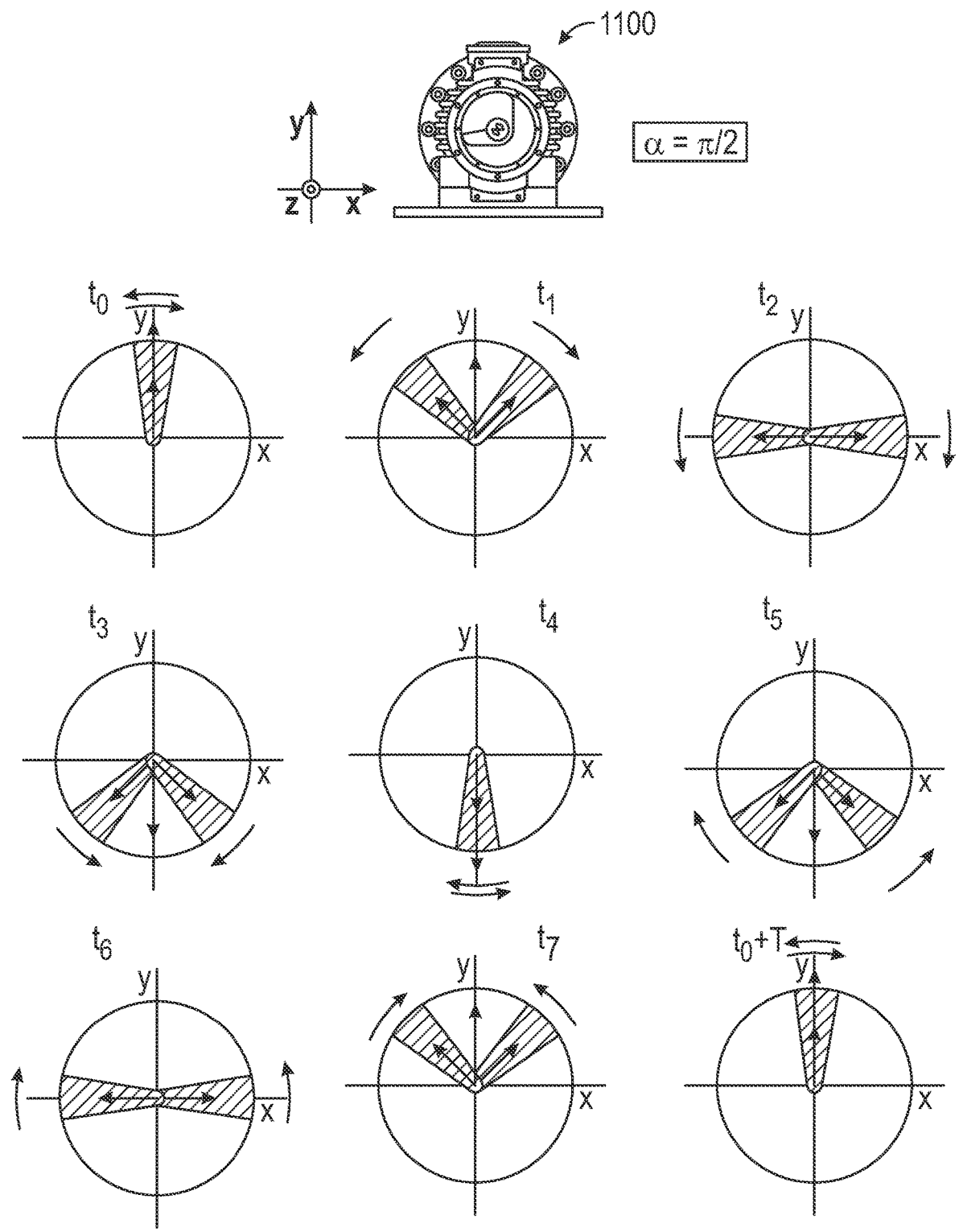
FIG. 14 illustrates time-dependent forces between mass members of an eccentric vibrator apparatus, in accordance with one or more embodiments of the disclosure.

FIG. 14 illustrates a fourth mode of vibration in which a linear oscillation is oriented at an angle with respect to the horizontal, in accordance with an embodiment of the disclosure. The control system may set the initial angles of respective rotations of the first shaft and the second shaft to $\pi/2$, causing a relative angle offset of approximately $\pi/2$, as is shown in FIG. 14. In this example, a first mass member may be advanced, for example, by $\pi/2$ while a second mass member may be advanced by $\pi/2$. As such, the first mass member may be essentially aligned with the second mass member at angles $\pi/2$ and $3\pi/2$, as is illustrated by the diagrams corresponding to $t_0$ and $t_4$ in FIG. 14 ($t_1$ equal to $t_0$ in FIG. 14). The oscillation of the resultant force f(t) may therefore be oriented essentially perpendicular to the horizontal (i.e., aligned along the y direction). As such, the motion is essentially a vertical, up-down vibration. In this mode of vibration, a screen frame or deck assembly may be caused to vibrate with a linear oscillatory motion that is essentially perpendicular to the ground.

The control systems described herein may cause changes to angles of respective rotations of collinear shafts during the operation of an eccentric vibrator apparatus. In this regard, a plane of oscillatory motion may be changed while the eccentric vibrator apparatus is running. In a different mode of operation, the vibratory motion may be changed from a linear oscillation to a circular or elliptical oscillation. For example, a control system may cause collinear shafts of an eccentric vibrator apparatus to rotate in a common direction and at a common angular velocity to generate an essentially circular mechanical excitation. For example, while the system is generating linear motion with counter rotating masses, the control system may change the direction of rotation of a first shaft (or, in some instances, a second shaft) of the substantially collinear shafts to be reversed. Upon such a reversal, the control system may also cause the first shaft and the second shaft to be angularly aligned—neither the first shaft nor the second shaft is angularly advanced or angularly retarded relative to the other shaft. Thus, the substantially collinear shafts are configured to rotate in a common direction at a common angular frequency $\omega$, without an angular shift between the shafts, resulting in a substantially circular motion of the eccentric vibrator apparatus. In further embodiments, elliptical as well as circular vibrations may be implemented with masses rotating in the same direction but with relative offsets.

In some embodiments, configuration of the substantially circular or elliptical motion may be implemented in response to actuation of a button on an HMI or upon selection of a selectable visual element displayed on a display device (which, in some embodiments, may be included in the HMI). The control of initial angles and ensuing relative angle offsets during operation of the eccentric vibrator apparatus may permit adjusting the orientation of a vibrating oscillation without a need for unmounting and re-mounting of the eccentric vibrator apparatus, as would be the case with a conventional vibration device. As such, disclosed systems and methods provide improved efficiency and/or versatility of the vibrating system.

In further embodiments, an eccentric vibrator apparatus may generate a substantially circular mechanical excitation, without reliance on a control system to configure circular motion and to provide power. In such embodiments, a direction of rotation of a shaft of the eccentric vibrator apparatus may be reversed by changing a polarity of two of three incoming power leads of a three-phase asynchronous induction motor that generates rotation of the shaft. For example, a three-phase system may include (i) a first line power L1, a second line power L2, and a third power line L3, and (ii) a first motor terminal T1, a second motor terminal T2, and a third motor terminal T3. Clockwise rotation of a shaft may be accomplished by connecting L1 to T1, L2 to T2, and L3 to T3. Alternatively, counterclockwise rotation of the shaft may be achieved by switching L1 to be connected to T3, maintaining L2 connected to T2, and switching L3 to be connected to T1.

A control system may allow real-time or nearly real-time control of motor assembly speed and/or vibrating force direction. A rate at which particulate matter is conveyed from a feed end to a discharge end of a separator system may, in turn, be controlled by controlling characteristics of an eccentric vibrator apparatus that is coupled to the separator system. In addition to shaker systems, an eccentric vibrator apparatus may be coupled to feeders, such as vibratory feeders, where feed rate of material may be accurately controlled. As an example, in high-volume processing applications, conveyance rate may be increased to move particulate matter or other types of solids away from a screening surface and/or to expose a screening surface area to an incoming flow of matter. As another example, a conveyance rate may be decreased to increase dryness of screened material by increasing a residence time of the material on a screening surface.

Figure 15:
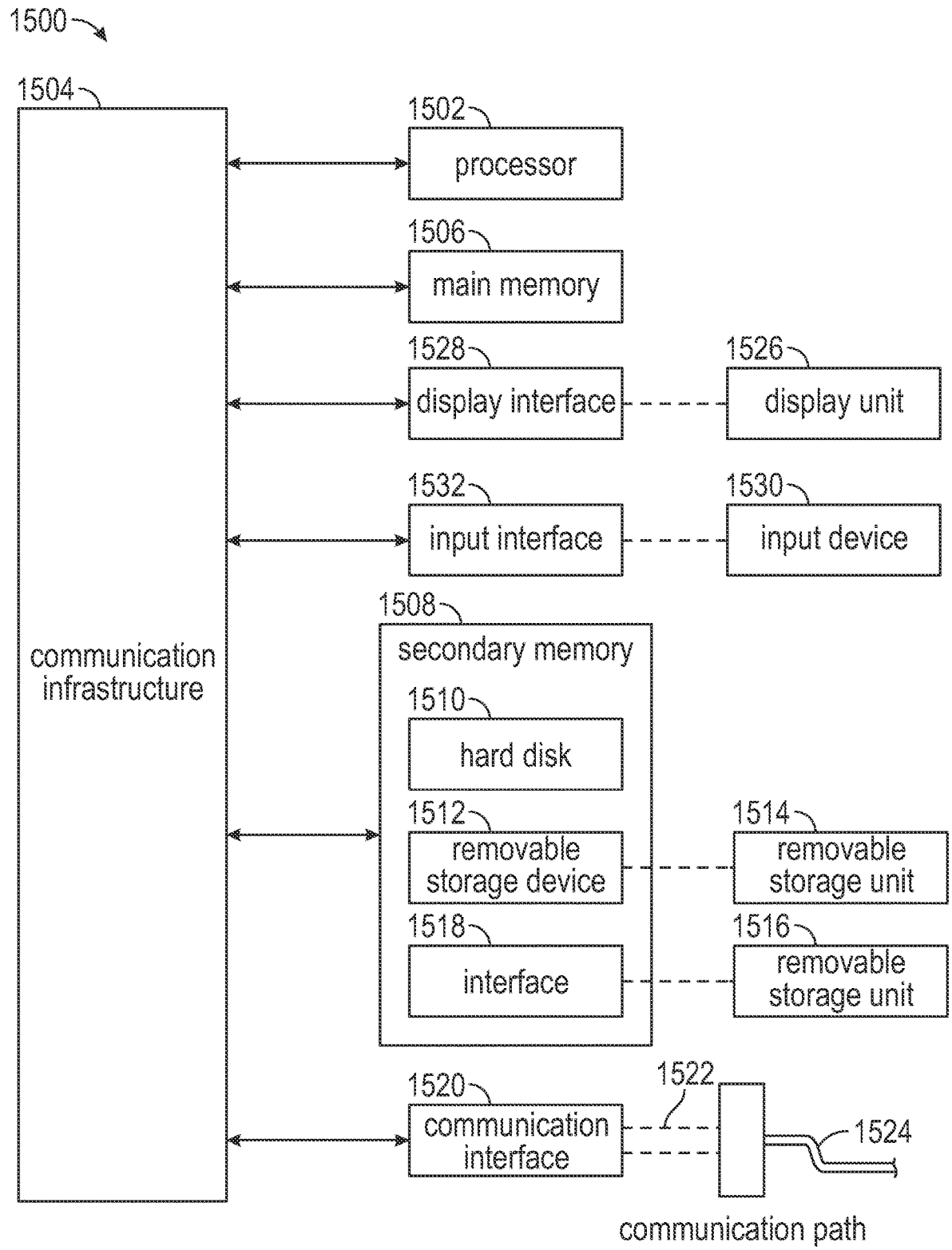
FIG. 15 is a block diagram of an example computer system, in which disclosed embodiments may be implemented, according to an embodiment of the present disclosure.

FIG. 15 is a block diagram of an example computer system 1500 in which disclosed embodiments, or portions thereof, may be implemented as computer-readable code (i.e., machine-readable computer program instructions), which is executed by one or more processors and causes the one or more processors to perform operations of the disclosed embodiments, according to an embodiment.

Disclosed systems may include components implemented on computer system 1500 using hardware, software, firmware, tangible computer-readable (i.e., machine-readable) media having computer program instructions stored thereon, or a combination thereof, and may be implemented in one or more computer systems or other processing system.

If programmable logic is used, such logic may be executed on a commercially available processing platform or a on a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various disclosed embodiments are described in terms of this example computer system 1500. After reading this description, persons of ordinary skill in the relevant art will know how to implement disclosed embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As persons of ordinary skill in the relevant art will understand, a computing device for implementing disclosed embodiments has at least one processor, such as processor 1502, wherein the processor may be a single processor, a plurality of processors, a processor in a multi-core/multi-processor system, such system operating alone, or in a cluster of computing devices operating in a cluster or server farm. Processor 1502 may be connected to a communication infrastructure 1504, for example, a bus, message queue, network, or multi-core message-passing scheme.

Computer system 1500 may also include a main memory 1506, for example, random access memory (RAM), and may also include a secondary memory 1508. Secondary memory 1508 may include, for example, a hard disk drive 1510, removable storage drive 1512. Removable storage drive 1512 may include a floppy disk drive, a magnetic tape drive, an optical disk drive, a flash memory, or the like. The removable storage drive 1512 may be configured to read and/or write data to a removable storage unit 1514 in a well-known manner. Removable storage unit 1514 may include a floppy disk, magnetic tape, optical disk, etc., which is read by and written to, by removable storage drive 1512. As will be appreciated by persons of ordinary skill in the relevant art, removable storage unit 1514 may include a computer readable storage medium having computer software (i.e., computer program instructions) and/or data stored thereon.

In alternative implementations, secondary memory 1508 may include other similar devices for allowing computer programs or other instructions to be loaded into computer system 1500. Such devices may include, for example, a removable storage unit 1516 and an interface 1518. Examples of such devices may include a program cartridge and cartridge interface (such as that found in video game devices), a removable memory chip (such as EPROM or PROM) and associated socket, and other removable storage units 1516 and interfaces 1518 which allow software and data to be transferred from the removable storage unit 1516 to computer system 1500.

Computer system 1500 may also include a communications interface 1520. Communications interface 1520 allows software and data to be transferred between computer system 1500 and external devices. Communications interfaces 1520 may include a modem, a network interface (such as an Ethernet card), a communications port, a PCMCIA slot and card, or the like. Software and data transferred via communications interface 1520 may be in the form of signals 1522, which may be electronic, electromagnetic, optical, or other signals capable of being received by communications interface 1520. These signals may be provided to communications interface 1520 via a communications path 1524.

In this document, the terms "computer program storage medium" and "computer usable storage medium" are used to generally refer to storage media such as removable storage unit 1514, removable storage unit 1516, and a hard disk installed in hard disk drive 1510. Computer program storage medium and computer usable storage medium may also refer to memories, such as main memory 1506 and secondary memory 1508, which may be semiconductor memories (e.g., DRAMS, etc.). Computer system 1500 may further include a display unit 1526 that interacts with communication infrastructure 1504 via a display interface 1528. Computer system 1500 may further include a user input device 1530 that interacts with communication infrastructure 1504 via an input interface 1532. A user input device 1530 may include a mouse, trackball, touch screen, or the like.

Computer programs (also called computer control logic or computer program instructions) are stored in main memory 1506 and/or secondary memory 1508. Computer programs may also be received via communications interface 1520. Such computer programs, when executed, enable computer system 1500 to implement embodiments as discussed herein. In particular, the computer programs, when executed, enable processor 1502 to implement the processes of disclosed embodiments, such various stages in disclosed methods, as described in greater detail above. Accordingly, such computer programs represent controllers of the computer system 1500. When an embodiment is implemented using software, the software may be stored in a computer program product and loaded into computer system 1500 using removable storage drive 1512, interface 1518, and hard disk drive 1510, or communications interface 1520. A computer program product may include any suitable non-transitory machine-readable (i.e., computer-readable) storage device having computer program instructions stored thereon.

Embodiments may be implemented using software, hardware, and/or operating system implementations other than those described herein. Any software, hardware, and operating system implementations suitable for performing the functions described herein may be utilized. Embodiments are applicable to both a client and to a server or a combination of both.

The disclosure sets forth example embodiments and, as such, is not intended to limit the scope of embodiments of the disclosure and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

The breadth and scope of embodiments of the disclosure should not be limited by any of the above-described example embodiments, but should be defined only in accordance with the following claims and their equivalents.

Conditional language, including terms such as "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and annexed drawings disclose examples of systems and systems that may provide configurable substantially eccentric mechanical excitations and/or substantially linear circular mechanical excitations. It is, of course, not possible to describe every conceivable combination of elements and/or methods for purposes of describing the various aspects of the disclosure, but it may be recognized that many further combinations and permutations of the disclosed elements are possible. Accordingly, various modifications may be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:
1. An apparatus, comprising:
a first shaft having a first end and a second end;

a second shaft having a third end and a fourth end, wherein the first and second shafts share a common axis and the first end and the third end are proximate to one another;

a first mass eccentrically mounted on the first shaft and configured to rotate about the first shaft;

a second mass eccentrically mounted on the second shaft and configured to rotate about the second shaft;

a third mass eccentrically mounted on the first shaft at a first angle relative to the first mass and configured to rotate about the first shaft;

a fourth mass eccentrically mounted on the second shaft at a second angle relative to the second mass and configured to rotate about the second shaft, wherein the third and fourth masses are respectively spatially separated from, and are configured to respectively act as partial counterbalance masses to, the first and second masses; and a drive system configured to selectively generate elliptical, circular, and linear vibratory motion such that:
in a first selectable configuration, the drive system imparts rotational motion to the first and second shafts to cause the first and second masses to rotate in a common direction to thereby generate elliptical or circular vibratory motion of the apparatus; and
in a second selectable configuration, the drive system imparts rotational motion to the first and second shafts to cause the first and second masses to rotate in opposite directions to thereby generate linear vibratory motion of the apparatus.

2. The apparatus of claim 1, wherein the drive system further comprises:
a first motor assembly attached to the first shaft, the first motor assembly configured to impart the rotational motion to the first shaft; and
a second motor assembly attached to the second shaft, the second motor assembly configured to impart the rotational motion to the second shaft.

3. The apparatus of claim 1, further comprising:
a control system configured to control rotational frequencies, directions, and relative angular positions of the first and second masses to thereby control linear, elliptical, and circular vibratory motion of the apparatus.

4. The apparatus of claim 3, wherein the control system is further configured to control an angle of linear motion by controlling relative angular positions of the first and second masses.

5. The apparatus of claim 4, wherein the control system is further configured to change the angle of linear motion from a first angle to a second angle during operation of the apparatus.

6. The apparatus of claim 3, wherein the control system is further configured to change from linear motion to elliptical or circular motion during operation of the apparatus.

7. The apparatus of claim 3, wherein the control system is further configured to control the first and second shafts to rotate in opposite directions with a common frequency to generate linear vibrations.

8. The apparatus of claim 3, wherein the control system is further configured to control the first and second shafts to rotate in a common direction with a common frequency to generate circular vibrations.

9. The apparatus of claim 3, further comprising:
a measurement device that is configured to measure an angular position and/or a velocity of the first and second masses.

10. The apparatus of claim 9, wherein the control system is further configured to control one or more of rotational frequencies, directions, and relative angular positions of the first and second masses based on measurements taken by the measurement device.

11. The apparatus of claim 3, wherein the control system is configured to control the vibratory motion to be a linear motion along a line that is oriented at an angle in a range from approximately 0 radians to approximately $\pi$ radians relative to a fixed direction.

12. The apparatus of claim 1, wherein:
the first mass is mounted at or proximate to the first end of the first shaft and the third mass is mounted at or proximate to the second end of the first shaft; and
the second mass is mounted at or proximate to the third end of the second shaft and the fourth mass is mounted at or proximate to the fourth end of the second shaft.

13. The apparatus of claim 1, wherein:
the first and third masses are substantially in parallel, and the second and fourth masses are substantially in parallel.

14. The apparatus of claim 1, wherein the first and second angles are each approximately 180 degrees.

15. A processor implemented method of controlling an apparatus that includes a first shaft having a first end and a second end; a second shaft having a third end and a fourth end, wherein the first and second shafts share a common axis and the first end and the third end are proximate to one another; a first mass eccentrically mounted on the first shaft and configured to rotate about the first shaft; a second mass eccentrically mounted on the second shaft and configured to rotate about the second shaft; a third mass eccentrically mounted on the first shaft at a first angle relative to the first mass and configured to rotate about the first shaft; and a fourth mass eccentrically mounted on the second shaft at a second angle relative to the second mass and configured to rotate about the second shaft, wherein the third and fourth masses are respectively spatially separated from, and are configured to respectively act as partial counterbalance masses to, the first and second masses; and a drive system configured to selectively generate elliptical, circular, and linear vibratory motion such that:
in a first selectable configuration, the drive system imparts rotational motion to the first and second shafts to cause the first and second masses to rotate in a common direction to thereby generate elliptical or circular vibratory motion of the apparatus; and
in a second selectable configuration, the drive system imparts rotational motion to the first and second shafts to cause the first and second masses to rotate in opposite directions to thereby generate linear vibratory motion of the apparatus,
the method comprising:
controlling, by a processor circuit, the drive system to select the first selectable configuration or the second selectable configuration.

16. The method of claim 15, further comprising controlling, by the processor circuit, the drive system to control an angle of linear motion by controlling relative angular positions of the first and second masses.

17. The method of claim 16, further comprising controlling, by the processor circuit, the drive system to change an angle of linear motion from a first angle to a second angle during operation of the apparatus.

18. The method of claim 15, further comprising controlling, by the processor circuit, the drive system to change from linear motion to elliptical or circular motion during operation of the apparatus.

19. The method of claim 15, further comprising controlling, by the processor circuit, the drive system to cause the first and second shafts to rotate in opposite directions with a common frequency to generate linear vibrations.

20. The method of claim 15, further comprising controlling, by the processor circuit, the drive system to cause the first and second shafts to rotate in the same direction with a common frequency to generate circular vibrations.

21. The method of claim 15, further comprising:
monitoring a measurement device, by the processor circuit, to measure an angular position and/or a velocity of the first and second masses; and
controlling, by the processor circuit, the drive system to control one or more of rotational frequencies, directions, and relative angular positions of the first and second masses, based on measurements taken by the measurement device.

22. The method of claim 15, further comprising controlling, by the processor circuit, the drive system to control the vibratory motion to be a linear motion along a line that is oriented at an angle in a range from approximately 0 radians to approximately $\pi$ radians relative to a fixed direction.

23. A method for controlling an eccentric vibrator that includes a first shaft having a first end and a second end; a second shaft having a third end and a fourth end, wherein the first and second shafts share a common axis and the first end and the third end are proximate to one another; a first mass eccentrically mounted on the first shaft and configured to rotate about the first shaft; a second mass eccentrically mounted on the second shaft and configured to rotate about the second shaft; a third mass eccentrically mounted on the first shaft at a first angle relative to the first mass and configured to rotate about the first shaft; and a fourth mass eccentrically mounted on the second shaft at a second angle relative to the second mass and configured to rotate about the second shaft, wherein the third and fourth masses are respectively spatially separated from, and are configured to respectively act as partial counterbalance masses to, the first and second masses; and a drive system configured to selectively generate elliptical, circular, and linear vibratory motion such that:
in a first selectable configuration, the drive system imparts rotational motion to the first and second shafts to cause the first and second masses to rotate in a common direction to thereby generate elliptical or circular vibratory motion of the eccentric vibrator; and
in a second selectable configuration, the drive system imparts rotational motion to the first and second shafts to cause the first and second masses to rotate in opposite directions to thereby generate linear vibratory motion of the eccentric vibrator,
the method comprising:
selecting, via the drive system, either the first selectable configuration or the second selectable configuration.

24. The method of claim 23, further comprising controlling the drive system to control an angle of linear motion by controlling relative angular positions of the first and second masses.

25. The method of claim 24, further comprising controlling the drive system to change an angle of linear motion from a first angle to a second angle during operation of the eccentric vibrator.

26. The method of claim 23, further comprising controlling the drive system to change from linear motion to elliptical or circular motion during operation of the eccentric vibrator.

27. The method of claim 23, further comprising controlling the drive system to cause the first and second shafts to rotate in opposite directions with a common frequency to generate linear vibrations.

28. The method of claim 23, further comprising controlling the drive system to cause the first and second shafts to rotate in the same direction with a common frequency to generate circular vibrations.

29. The method of claim 23, further comprising:
monitoring a measurement device to measure an angular position and/or a velocity of the first and second masses; and
controlling the drive system to control one or more of rotational frequencies, directions, and relative angular positions of the first and second masses, based on measurements taken by the measurement device.

30. The method of claim 23, further comprising controlling the drive system to control the vibratory motion to be a linear motion along a line that is oriented at an angle in a range from approximately 0 radians to approximately $\pi$ radians relative to a fixed direction.

* * * * *